(12) United States Patent
Tian et al.

(10) Patent No.: US 12,489,833 B2
(45) Date of Patent: Dec. 2, 2025

(54) PARSING COMPONENT, PACKET PARSING METHOD, FORWARDING CHIP, AND NETWORK DEVICE

(71) Applicant: HUAWEI TECHNOLOGIES CO., LTD., Shenzhen (CN)

(72) Inventors: Taixu Tian, Dongguan (CN); Wenliang Shen, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 531 days.

(21) Appl. No.: 17/976,641

(22) Filed: Oct. 28, 2022

(65) Prior Publication Data

US 2023/0135519 A1 May 4, 2023

(30) Foreign Application Priority Data

Oct. 30, 2021 (CN) .......................... 202111278125.7

(51) Int. Cl.
*H04L 69/22* (2022.01)

(52) U.S. Cl.
CPC .................................. *H04L 69/22* (2013.01)

(58) Field of Classification Search
None
See application file for complete search history.

(56) References Cited

U.S. PATENT DOCUMENTS

| 7,293,113 B1 * | 11/2007 | Krishna ................... H04L 69/16 713/324 |
| 2005/0122918 A1 * | 6/2005 | Johnston ................. H04L 69/12 370/310 |
| 2013/0215906 A1 | 8/2013 | Hidai |
| 2015/0081726 A1 * | 3/2015 | Izenberg ............. G06F 16/2471 707/755 |
| 2015/0189047 A1 | 7/2015 | Naaman et al. |
| 2016/0197852 A1 * | 7/2016 | Hutchison ........... H04L 49/1546 370/392 |
| 2021/0176345 A1 * | 6/2021 | Urman ..................... H04L 69/22 |
| 2021/0185153 A1 * | 6/2021 | Kittner .................... H04L 69/26 |
| 2021/0326175 A1 * | 10/2021 | Herbert ................... G06F 9/541 |

(Continued)

FOREIGN PATENT DOCUMENTS

| CN | 107650857 A | 2/2018 |
| CN | 108725375 A | 11/2018 |
| WO | 2020087400 A1 | 5/2020 |

*Primary Examiner* — Duc T Duong

(74) *Attorney, Agent, or Firm* — Leydig, Voit & Mayer, Ltd.

(57) ABSTRACT

A parsing component includes m parsing units. At least one parsing unit in them parsing units includes a fixed parsing module and a configurable parsing module. The fixed parsing module stores fixed protocol content. The configurable parsing module is configured to configure protocol content in the configurable parsing module based on obtained content configuration information. Each parsing module in the fixed parsing module and the configurable parsing module is configured to parse a packet based on the protocol content in the parsing module. A target parsing unit is configured to separately parse, by using a fixed parsing module in the target parsing unit and a configurable parsing module in the target parsing unit, a packet input into the target parsing unit. This application helps improve parsing efficiency of the parsing component.

14 Claims, 18 Drawing Sheets

(56) References Cited

U.S. PATENT DOCUMENTS

2021/0328923 A1* 10/2021 Urman .................... H04L 69/12
2022/0337600 A1* 10/2022 Hossain ............... G06Q 20/385
2025/0233932 A1*  7/2025 Xie ........................ H04L 69/18

* cited by examiner

US 12,489,833 B2

PARSING COMPONENT, PACKET PARSING METHOD, FORWARDING CHIP, AND NETWORK DEVICE

CROSS-REFERENCE TO RELATED APPLICATIONS

This application claims priority to Chinese Patent Application No. 202111278125.7, filed on Oct. 30, 2021, which is hereby incorporated by reference in its entirety.

TECHNICAL FIELD

This application relates to the field of network technologies, and in particular, to a parsing component, a packet parsing method, a forwarding chip, and a network device.

BACKGROUND

A forwarding chip in a network device usually includes a parsing component (parser), a processing component, and an editing component that are sequentially connected. The parsing component is configured to parse a packet to determine key information (for example, a protocol type and a destination address carried in the packet) of the packet. The processing component is configured to process the packet (for example, perform route searching) based on the key information of the packet. The editing component is configured to edit the packet based on a processing result of the processing component.

The packet usually includes a packet body and a plurality of layers of packet headers sequentially encapsulated outside the packet body. Each layer of packet header corresponds to one protocol layer in a layered protocol architecture specified by standards organizations such as the Internet Engineering Task Force (IETF) and the Institute of Electrical and Electronics Engineers (IEEE). Each layer of packet header complies with a protocol of the corresponding protocol layer. The parsing component usually parses the packet layer by layer starting from the outermost layer of the packet according to the layered protocol architecture specified by the standards organizations such as the IETF and the IEEE. However, parsing efficiency of a current parsing component is low.

SUMMARY

This application provides a parsing component, a packet parsing method, a forwarding chip, and a network device. Technical solutions are as follows.

According to a first aspect, a parsing component is provided. The parsing component includes m parsing units, where m is a positive integer. At least one parsing unit in the m parsing units includes a fixed parsing module and a configurable parsing module. The fixed parsing module stores fixed protocol content. The configurable parsing module is configured to configure protocol content in the configurable parsing module based on obtained content configuration information. Each parsing module in the fixed parsing module and the configurable parsing module is configured to parse, based on the protocol content in the parsing module, a packet input into the parsing module. A target parsing unit in the m parsing units is configured to separately parse, by using a fixed parsing module in the target parsing unit and a configurable parsing module in the target parsing unit, a packet input into the target parsing unit. The target parsing unit is any parsing unit that is in the m parsing units and that includes a fixed parsing module and a configurable parsing module.

In the technical solution provided in this application, because the at least one parsing unit in the parsing component includes the fixed parsing module and the configurable parsing module, and the configurable parsing module enables the parsing component to support a protocol change, scalability of the parsing component is strong. In addition, the parsing component combines the fixed parsing module and the configurable parsing module, so that the scalability of the parsing component can be enhanced, and costs and power consumption of the parsing component can be reduced. In addition, the target parsing unit in the parsing component may separately parse, by using the fixed parsing module in the target parsing unit and the configurable parsing module in the target parsing unit, the packet input into the target parsing unit, and this helps improve packet parsing efficiency and parsing efficiency of the parsing component.

Optionally, a fixed parsing module in the m parsing units corresponds to n protocol layers, a fixed parsing module corresponding to each protocol layer stores fixed protocol content of the protocol layer, and n is a positive integer. The configurable parsing module is configured to configure protocol content of a target protocol layer in the configurable parsing module based on obtained content configuration information of the target protocol layer. The target protocol layer is one of the n protocol layers, or the target protocol layer is a protocol layer inserted into the n protocol layers.

In the technical solution provided in this application, because the configurable parsing module can configure the protocol content of the target protocol layer in the configurable parsing module based on the obtained content configuration information of the target protocol layer, when the target protocol layer is a protocol layer in the n protocol layers, the parsing component may support protocol content extension in an original protocol layer, and when the target protocol layer is a protocol layer inserted into the n protocol layers, the parsing component may support protocol layer extension between different original protocol layers.

Optionally, the m parsing units are sequentially connected, the m parsing units each include a fixed parsing module, fixed parsing modules in the m parsing units form w fixed parsing groups, each fixed parsing group includes n fixed parsing modules, and the n fixed parsing modules are in a one-to-one correspondence with the n protocol layers. An $i^{th}$ fixed parsing module in the n fixed parsing modules stores fixed protocol content of an $i^{th}$ protocol layer in the n protocol layers, and an $(i-1)^{th}$ fixed parsing module in the n fixed parsing modules stores a fixed protocol type of the $i^{th}$ protocol layer. The $i^{th}$ fixed parsing module corresponds to the $i^{th}$ protocol layer, $1 < i \le n$, and both w and i are positive integers.

Optionally, the m parsing units each include a configurable parsing module. In the m parsing units, a $j^{th}$ parsing unit includes a $j^{th}$ configurable parsing module and an $i^{th}$ fixed parsing module in a $k^{th}$ fixed parsing group, and a $(j-1)^{th}$ parsing unit includes a $(j-1)^{th}$ configurable parsing module and an $(i-1)^{th}$ fixed parsing module in the $k^{th}$ fixed parsing group, where $1 \le k \le w$, $1 < j \le m$, and both k and j are integers. The $j^{th}$ configurable parsing module is configured to configure the protocol content of the target protocol layer in the $j^{th}$ configurable parsing module based on the obtained content configuration information of the target protocol layer. The $(j-1)^{th}$ configurable parsing module is configured to configure a protocol type of the target protocol layer in the $(j-1)^{th}$ configurable parsing module based on obtained type configuration information of the target protocol layer. The target protocol layer is the $i^{th}$ protocol layer, or the target protocol layer is a protocol layer inserted between the $i^{th}$ protocol layer and an $(i+1)^{th}$ protocol layer in the n protocol layers.

Optionally, $j=i+s\times(k-1)$, where i takes all values in a range [1, j], and s is determined based on an arrangement of the w fixed parsing groups.

Optionally, the w fixed parsing groups are arranged in an array along a first direction, and w first fixed parsing modules in the w fixed parsing groups belong to w parsing units in the m parsing units. For any two adjacent fixed parsing groups in the w fixed parsing groups, there is an interval of s−1 parsing units between two parsing units to which two first fixed parsing modules in the two fixed parsing groups belong. For example, s=1, and s−1=0. For any two adjacent fixed parsing groups in the w fixed parsing groups, two parsing units to which two first fixed parsing modules in the two fixed parsing groups belong are adjacent.

Optionally, for the $k^{th}$ fixed parsing group, a $(k+1)^{th}$ fixed parsing group, and a $(k+2)^{th}$ fixed parsing group in the w fixed parsing groups, a parsing unit to which the first fixed parsing module in the $(k+1)^{th}$ fixed parsing group belongs is located after a parsing unit to which the first fixed parsing module in the $k^{th}$ fixed parsing group belongs, and a parsing unit to which the first fixed parsing module in the $(k+2)^{th}$ fixed parsing group belongs is located after the parsing unit to which the first fixed parsing module in the $(k+1)^{th}$ fixed parsing group belongs. The $k^{th}$ fixed parsing group, the $(k+1)^{th}$ fixed parsing group, and the $(k+2)^{th}$ fixed parsing group are any three adjacent fixed parsing groups in the w fixed parsing groups. In this way, the w fixed parsing groups may be deployed in a staggered manner, so that the parsing component supports protocol layer insertion in the n protocol layers.

Optionally, the w parsing units are w parsing units located at the forefront in the m parsing units.

Optionally, a configurable parsing module in the m parsing units forms a configurable parsing group, and the first direction is a direction from approaching the configurable parsing group to being away from the configurable parsing group. In the w fixed parsing groups, a fixed parsing group closest to the configurable parsing group is the first fixed parsing group, and a fixed parsing group farthest from the configurable parsing group is a $w^{th}$ fixed parsing group.

Optionally, the first configurable parsing module in the configurable parsing group and the first fixed parsing module in the first fixed parsing group belong to a same parsing unit.

Optionally, the fixed parsing module and the configurable parsing module each include a switch element, and the switch element in each parsing module in the fixed parsing module and the configurable parsing module is configured to control an enabled/disabled state of the parsing module. Each parsing module in the fixed parsing module and the configurable parsing module is configured to: when the parsing module is in an enabled state, parse, based on protocol content in the parsing module, a packet input into the parsing module.

In the technical solution provided in this application, the switch element is disposed in each of the fixed parsing module and the configurable parsing module, so that the fixed parsing module and the configurable parsing module can be flexibly controlled, enabling or disabling of the fixed parsing module can be implemented as required, and enabling or disabling of the configurable parsing module can be implemented as required. This helps a combination of the fixed parsing module and the configurable parsing module to support protocol extension.

According to a second aspect, a forwarding chip is provided. The forwarding chip includes the parsing component provided in any one of the first aspect or the optional implementations of the first aspect.

Optionally, the forwarding chip further includes a processing component and an editing component. The parsing component, the processing component, and the editing component are sequentially connected. The parsing component is configured to parse a packet input into the parsing component. The processing component is configured to process the packet based on a parsing result of the parsing component. The editing component is configured to edit the packet based on a processing result of the processing component.

Optionally, there are one or more processing components in the forwarding chip.

Optionally, the forwarding chip is an application-specific integrated circuit (ASIC) chip, a field programmable gate array (FPGA) chip, a network processor (NP) chip, or a generic array logic (GAL) chip.

According to a third aspect, a network device is provided. The network device includes the forwarding chip provided in any one of the second aspect or the optional implementations of the second aspect.

According to a fourth aspect, a packet parsing method is provided. The method is applied to a parsing component, the parsing component includes m parsing units, at least one parsing unit in the m parsing units includes a fixed parsing module and a configurable parsing module, the fixed parsing module stores fixed protocol content, the configurable parsing module is configured with protocol content, and m is a positive integer.

The method includes: A target parsing unit in the m parsing units separately parses, by using a fixed parsing module in the target parsing unit and a configurable parsing module in the target parsing unit, a packet input into the target parsing unit. The target parsing unit is any parsing unit that is in the m parsing units and that includes a fixed parsing module and a configurable parsing module.

That a fixed parsing module in the target parsing unit and a configurable parsing module in the target parsing unit separately parse a packet input into the target parsing unit includes: The fixed parsing module parses the packet based on protocol content in the fixed parsing module. The configurable parsing module parses the packet based on protocol content in the configurable parsing module.

Optionally, the method further includes: The configurable parsing module configures the protocol content in the configurable parsing module based on obtained content configuration information.

Optionally, a fixed parsing module in the m parsing units corresponds to n protocol layers, a fixed parsing module corresponding to each protocol layer stores fixed protocol content of the protocol layer, and n is a positive integer. That the configurable parsing module configures the protocol content in the configurable parsing module based on obtained content configuration information includes: The configurable parsing module configures protocol content of a target protocol layer in the configurable parsing module based on obtained content configuration information of the target protocol layer. The target protocol layer is one of the n protocol layers, or the target protocol layer is a protocol layer inserted into the n protocol layers.

Optionally, the m parsing units are sequentially connected, the m parsing units each include a configurable parsing module and a fixed parsing module, fixed parsing modules in the m parsing units form w fixed parsing groups, each fixed parsing group includes n fixed parsing modules, the n fixed parsing modules are in a one-to-one correspondence with the n protocol layers, an $i^{th}$ fixed parsing module in the n fixed parsing modules stores fixed protocol content of an $i^{th}$ protocol layer in the n protocol layers, and an $(i-1)^{th}$ fixed parsing module in the n fixed parsing modules stores a fixed protocol type of the $i^{th}$ protocol layer, where the $i^{th}$ fixed parsing module corresponds to the $i^{th}$ protocol layer, $1 < i \leq n$, and both w and i are positive integers.

In the m parsing units, a $j^{th}$ parsing unit includes a $j^{th}$ configurable parsing module and an $i^{th}$ fixed parsing module in a $k^{th}$ fixed parsing group, and a $(j-1)^{th}$ parsing unit includes a $(j-1)^{th}$ configurable parsing module and an $(i-1)^{th}$ fixed parsing module in the $k^{th}$ fixed parsing group, where $1 \leq k \leq w$, $1 < j \leq m$, and both k and j are integers.

That the configurable parsing module configures protocol content of a target protocol layer in the configurable parsing module based on obtained content configuration information of the target protocol layer includes: The $j^{th}$ configurable parsing module configures the protocol content of the target protocol layer in the $j^{th}$ configurable parsing module based on the obtained content configuration information of the target protocol layer.

The method further includes: The $(j-1)^{th}$ configurable parsing module configures a protocol type of the target protocol layer in the $(j-1)^{th}$ configurable parsing module based on obtained type configuration information of the target protocol layer.

The target protocol layer is the $i^{th}$ protocol layer, or the target protocol layer is a protocol layer inserted between the $i^{th}$ protocol layer and an $(i+1)^{th}$ protocol layer in the n protocol layers.

Optionally, the fixed parsing module and the configurable parsing module each include a switch element, and the switch element in each parsing module in the fixed parsing module and the configurable parsing module is configured to control an enabled/disabled state of the parsing module.

That the fixed parsing module parses the packet based on protocol content in the fixed parsing module includes: When the fixed parsing module is in an enabled state, the fixed parsing module parses the packet based on the protocol content in the fixed parsing module.

That the configurable parsing module parses the packet based on protocol content in the configurable parsing module includes: When the configurable parsing module is in an enabled state, the configurable parsing module parses the packet based on the protocol content in the configurable parsing module.

For technical effects of the fourth aspect and the optional implementations of the fourth aspect, refer to the technical effects of the first aspect and the optional implementations of the first aspect. Details are not described herein again.

The technical solutions provided in this application bring the following beneficial effects:

According to the parsing component, the packet parsing method, the forwarding chip, and the network device provided in this application, because the at least one parsing unit in the parsing component includes the fixed parsing module and the configurable parsing module, and the configurable parsing module enables the parsing component to support a protocol change, scalability of the parsing component is strong. In addition, some stable protocols may be stored in the fixed parsing module, and a protocol that may change may be configured in the configurable parsing module. In this way, the configurable parsing module does not need to support all protocols, and this helps save parsing resources and reduce power consumption of packet parsing. In addition, the target parsing unit in the parsing component may separately parse, by using the fixed parsing module in the target parsing unit and the configurable parsing module in the target parsing unit, the packet input into the target parsing unit, and this helps improve parsing efficiency.

DETAILED DESCRIPTION OF EMBODIMENTS

The following further describes in detail embodiments of this application with reference to the accompanying drawings.

A forwarding chip is a chip configured to forward a packet in a network device. An architecture of the forwarding chip is usually a pipeline architecture, and includes a parsing component, a processing component, and an editing component that are sequentially connected. The parsing component is configured to parse the packet to determine key information of the packet, where the key information is, for example, a protocol type of the packet, a destination address carried in the packet, and a value of an offset field of the packet. The processing component is configured to process the packet based on the key information of the packet, for example, perform route searching to obtain a next-hop address. The editing component is configured to edit the packet based on a processing result of the processing component, for example, encapsulate the next-hop address in the packet. There may be one or more processing components, and different processing components may have different functions.

An architecture of network protocols is usually a layered architecture, and a packet that complies with the network protocols is usually also layered. For example, the packet usually includes a packet body and a plurality of layers of packet headers sequentially encapsulated outside the packet body. Each layer of packet header corresponds to one protocol layer, and each layer of packet header complies with a protocol of the corresponding protocol layer. Each layer of packet header includes a key protocol field, a value in the key protocol field indicates a protocol type of a next-layer packet header of the packet header, and different values in the key protocol field indicate different protocol types of the next-layer packet header of the packet header. For example, a key protocol field in an Ethernet (ETH) packet header may be an Ethernet type (eth_type) field, and a value in the eth_type field may indicate that a next-layer packet header of the ETH packet header is an internet protocol version 4 (IPv4) packet header or an internet protocol version 6 (IPv6) packet header. A key protocol field in a user datagram protocol (UDP) packet header may be a destination port (destport) field, and a value in the destport field may indicate that a next-layer packet header of the UDP packet header is a dynamic host configuration protocol (DHCP) packet header or a file transfer protocol (FTP) packet header.

Figure 1:
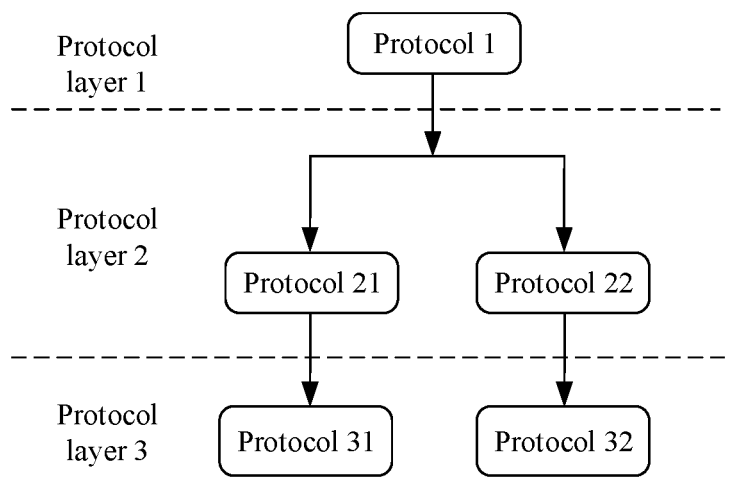
FIG. 1 is a schematic diagram of a structure of a protocol tree according to an embodiment of this application.
Figure 2:
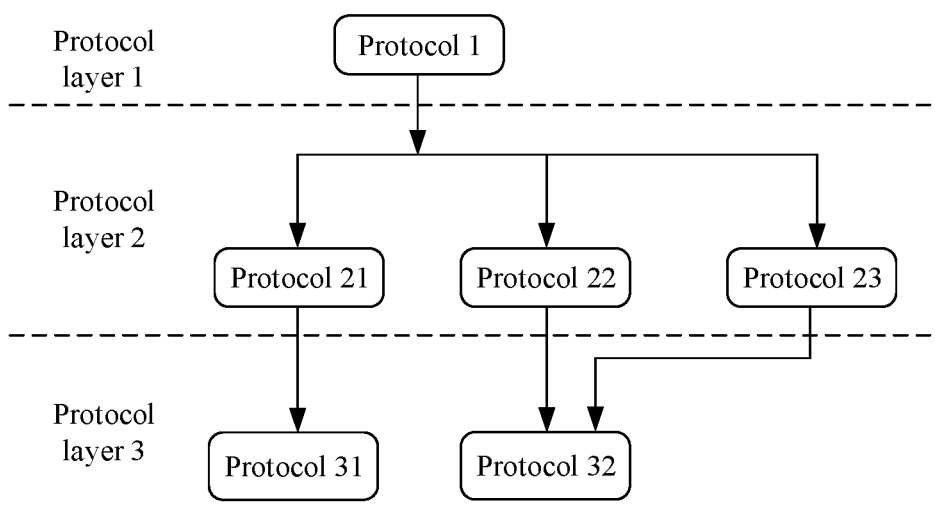
FIG. 2 is a schematic diagram of a structure of another protocol tree according to an embodiment of this application.
Figure 3:
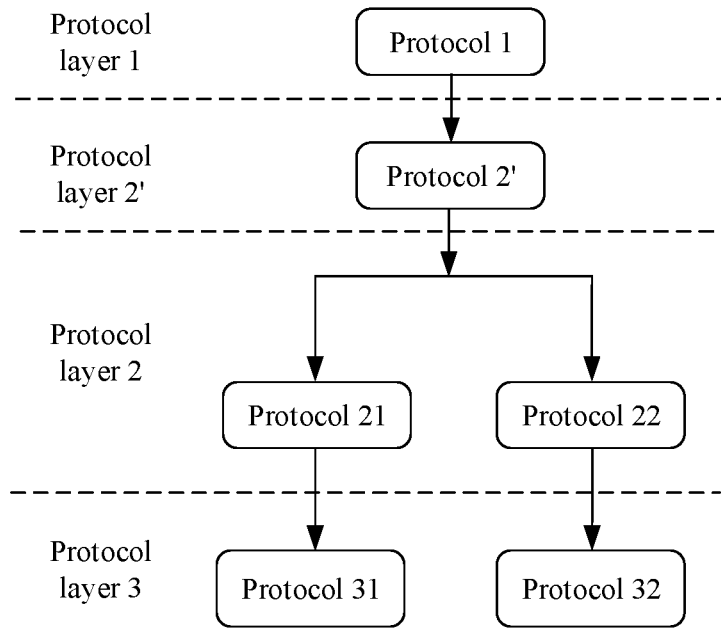
FIG. 3 is a schematic diagram of a structure of still another protocol tree according to an embodiment of this application.
Figure 4:
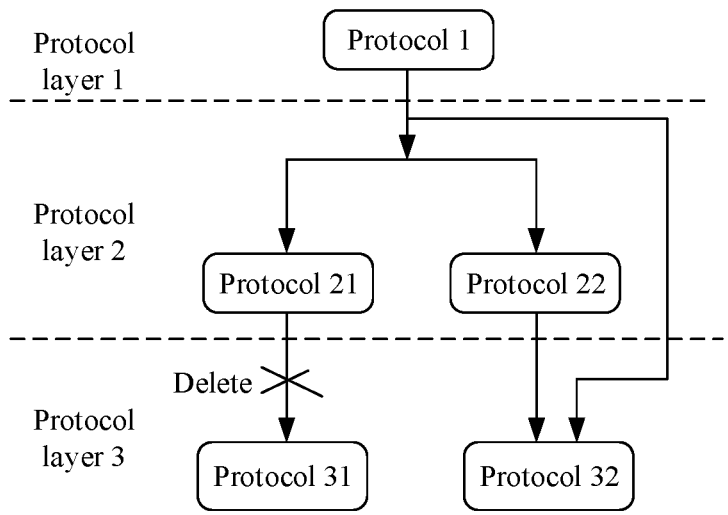
FIG. 4 is a schematic diagram of a structure of yet another protocol tree according to an embodiment of this application.

With continuous evolution of the network protocols, the network device needs to support packet forwarding performed based on a new protocol. A parsing function corresponding to the new protocol needs to be added to the forwarding chip in the network device. From a perspective of network protocol evolution, evolution of the network protocols usually includes: adding new protocol content to an original protocol layer, adding a new protocol layer between different original protocol layers, changing or deleting a hierarchical relationship between original protocol layers, and so on. A topology of the network protocols is usually a tree topology, and the topology of the network protocols may be referred to as a protocol tree or a protocol parsing tree. For example, an original protocol tree is shown in FIG. 1. The protocol tree includes three protocol layers: a protocol layer 1, a protocol layer 2, and a protocol layer 3. The protocol layer 1 includes a protocol 1, the protocol layer 2 includes a protocol 21 and a protocol 22, and the protocol layer 3 includes a protocol 31 and a protocol 32. The protocol 1 can indicate the protocol 21 and the protocol 22, the protocol 21 can indicate the protocol 31, and the protocol 22 can indicate the protocol 32. For example, a protocol tree obtained after new protocol content is added to an original protocol layer of the protocol tree shown in FIG. 1 is shown in FIG. 2. With reference to FIG. 2, it can be learned that a new protocol 23 is added to the protocol layer 2 of the protocol tree shown in FIG. 1, the protocol 1 can indicate the protocol 23, and the protocol 23 can indicate the protocol 32. For example, a protocol tree obtained after a new protocol layer is added between different protocol layers of the protocol tree shown in FIG. 1 is shown in FIG. 3. With reference to FIG. 3, it can be learned that a new protocol layer 2' is added between the protocol layer 1 and the protocol layer 2, the protocol layer 2' includes a protocol 2', the protocol 1 can indicate the protocol 2', and the protocol 2' can indicate the protocol 21 and the protocol 22. For example, a protocol tree obtained after a hierarchical relationship between protocol layers of the protocol tree shown in FIG. 1 is changed or deleted is shown in FIG. 4. With reference to FIG. 4, it can be learned that the protocol 31 at the protocol layer 3 is deleted, and the protocol 1 at the protocol layer 1 directly indicates the protocol 32 at the protocol layer 3.

The parsing component is an important component in the forwarding chip. Whether the parsing component supports a protocol change determines whether the forwarding chip supports a new service. Currently, scalability of the parsing component is poor. As a result, the parsing component cannot support the protocol change. When the protocol change occurs, a new parsing component usually needs to be developed, and even a new forwarding chip needs to be developed. Consequently, costs of the protocol change are high. For example, the current parsing component cannot support protocol changes shown in FIG. 2 to FIG. 4. When any protocol change shown in FIG. 2 to FIG. 4 occurs, a new forwarding chip needs to be developed. Consequently, costs of the protocol change are high. In addition, although some current parsing components can support the protocol change, costs are high, power consumption is high, and parsing efficiency of the parsing components is low.

In view of the foregoing problems existing in the current parsing component, embodiments of this application provide a parsing component, a packet parsing method, a forwarding chip, and a network device. The parsing component provided in embodiments of this application includes m parsing units. At least one parsing unit in the m parsing units includes a fixed parsing module and a configurable parsing module. The fixed parsing module stores fixed protocol content. The configurable parsing module is configured to configure protocol content in the configurable parsing module based on obtained content configuration information. Each parsing module in the fixed parsing module and the configurable parsing module is configured to parse, based on the protocol content in the parsing module, a packet input into the parsing module. A target parsing unit in the m parsing units is configured to separately parse, by using a fixed parsing module in the target parsing unit and a configurable parsing module in the target parsing unit, a packet input into the target parsing unit. The target parsing unit is any parsing unit that is in the m parsing units and that includes a fixed parsing module and a configurable parsing module. Because the at least one parsing unit in the parsing component includes the fixed parsing module and the configurable parsing module, and the configurable parsing module enables the parsing component to support a protocol change, scalability of the parsing component is strong. In addition, some stable protocols may be stored in the fixed parsing module, and a protocol that may change may be configured in the configurable parsing module, or a resource in the configurable parsing module is reserved to support future protocol extension. In this way, the configurable parsing module does not need to support all protocols, and this helps save parsing resources and reduce power consumption of packet parsing. In addition, the target parsing unit in the parsing component may separately parse, by using the fixed parsing module in the target parsing unit and the configurable parsing module in the target parsing unit, the packet input into the target parsing unit, and this helps improve parsing efficiency.

The following describes technical solutions of this application. Embodiments of the parsing component in this application are first described.

Figure 5:
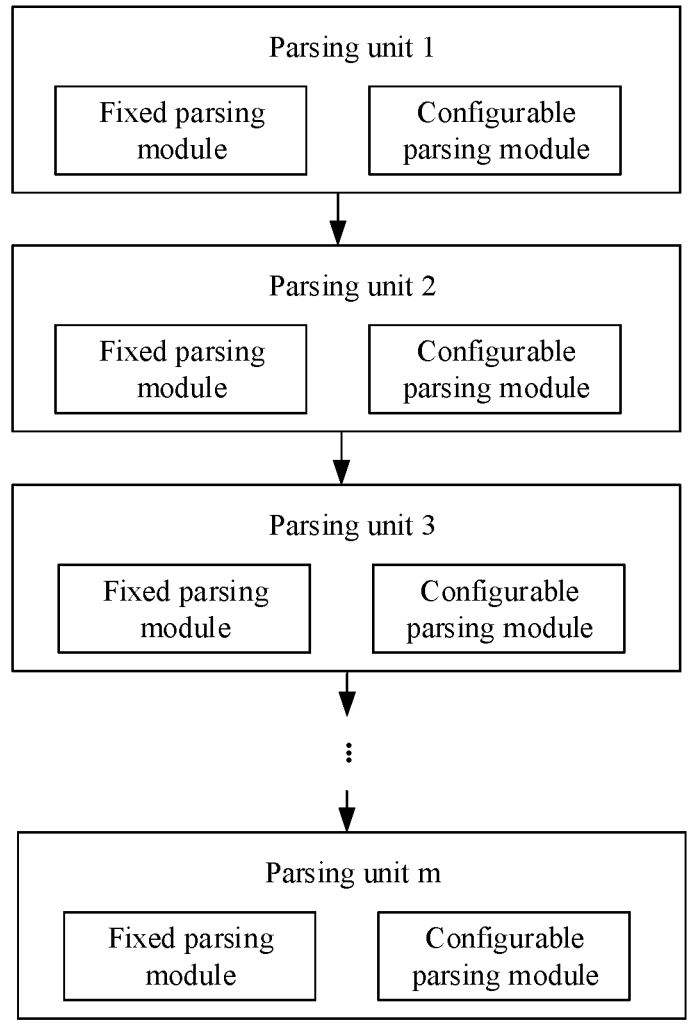
FIG. 5 is a schematic diagram of a structure of a parsing component according to an embodiment of this application.

FIG. 5 is a schematic diagram of a structure of a parsing component according to an embodiment of this application. The parsing component includes m parsing units, where m is a positive integer. At least one parsing unit in the m parsing units includes a fixed parsing module and a configurable parsing module. The fixed parsing module stores fixed protocol content. The configurable parsing module is configured to configure protocol content in the configurable parsing module based on obtained content configuration information. The content configuration information may be sent by a controller to the configurable parsing module, or may be manually configured in the configurable parsing module. Each parsing module in the fixed parsing module and the configurable parsing module is configured to parse, based on the protocol content in the parsing module, a packet input into the parsing module. A target parsing unit in the m parsing units is configured to separately parse, by using a fixed parsing module in the target parsing unit and a configurable parsing module in the target parsing unit, a packet input into the target parsing unit. The target parsing unit is any parsing unit that is in the m parsing units and that includes a fixed parsing module and a configurable parsing module.

m is greater than or equal to 1. As shown in FIG. 5, in this embodiment of this application, an example in which m is greater than 1, the m parsing units are a parsing unit 1 to a parsing unit m, and each of the m parsing units includes a fixed parsing module and a configurable parsing module is used for description.

In this embodiment of this application, a physical implementation of the fixed parsing module is a hardware circuit, and protocol content stored in the fixed parsing module usually cannot be changed. For example, the protocol content stored in the fixed parsing module may include a protocol number, a protocol identification basis, and the like. In addition, the fixed parsing module usually further stores a fixed protocol type, and a protocol type stored in each fixed parsing module is a protocol type of a next protocol layer of a protocol layer to which protocol content in the fixed parsing module belongs (in other words, the protocol content stored in each fixed parsing module includes the protocol type of the next protocol layer of the protocol layer to which the protocol content belongs). For example, for an Ethernet protocol, protocol content of an Ethernet protocol layer may include various possible values of eth_type, for example, 0x8100, 0x0800, 0x0806, and 0x8847. Each value in 0x8100, 0x0800, 0x0806, and 0x8847 indicates a possible protocol type of a next protocol layer of the Ethernet protocol layer. For example, 0x8100 indicates that a protocol type of the next protocol layer of the Ethernet protocol layer is an internet protocol (IP), and 0x0800 indicates that a protocol type of the next protocol layer of the Ethernet protocol layer is a virtual local area network (VLAN) protocol.

In this embodiment of this application, a physical implementation of the configurable parsing module may be a hardware circuit, and the hardware circuit may include a storage component, for example, a register. Protocol content configured in the configurable parsing module may be changed. For example, the configurable parsing module may change the protocol content in the configurable parsing module based on obtained protocol content information. In addition, the configurable parsing module may further configure a protocol type based on obtained protocol type information, and a protocol type in each configurable parsing module is a protocol type of a next protocol layer of a protocol layer to which protocol content in the configurable parsing module belongs.

In conclusion, for the parsing component provided in this embodiment of this application, because the at least one parsing unit in the parsing component includes the fixed parsing module and the configurable parsing module, and the configurable parsing module enables the parsing component to support a protocol change, scalability of the parsing component is strong. In addition, the parsing component combines the fixed parsing module and the configurable parsing module, so that the scalability of the parsing component can be enhanced, and costs and power consumption of the parsing component can be reduced. In addition, the target parsing unit in the parsing component may separately parse, by using the fixed parsing module in the target parsing unit and the configurable parsing module in the target parsing unit, the packet input into the target parsing unit, and this helps improve parsing efficiency of the parsing component.

In an optional embodiment, a fixed parsing module in the m parsing units corresponds to n protocol layers, then protocol layers may be all or a part of protocol layers in a layered protocol architecture, and n is a positive integer, for example, n>1. In this embodiment of this application, an example in which the n protocol layers are all the protocol layers in the layered protocol architecture is used for description. A fixed parsing module corresponding to each of the n protocol layers stores fixed protocol content of the protocol layer. The configurable parsing module is configured to configure protocol content of a target protocol layer in the configurable parsing module based on obtained content configuration information of the target protocol layer. The target protocol layer is one of the n protocol layers, or the target protocol layer is a protocol layer inserted into the n protocol layers. When the target protocol layer is one of the n protocol layers, because the configurable parsing module can configure the protocol content of the target protocol layer in the configurable parsing module, the configurable parsing module may support protocol content extension in an original protocol layer of the n protocol layers, so that the parsing component supports protocol content extension in the original protocol layer. When the target protocol layer is a protocol layer inserted into the n protocol layers, because the configurable parsing module can configure the protocol content of the target protocol layer in the configurable parsing module, the configurable parsing module may support protocol layer insertion between different original protocol layers in the n protocol layers, so that the parsing component supports protocol layer extension.

Figure 6A:
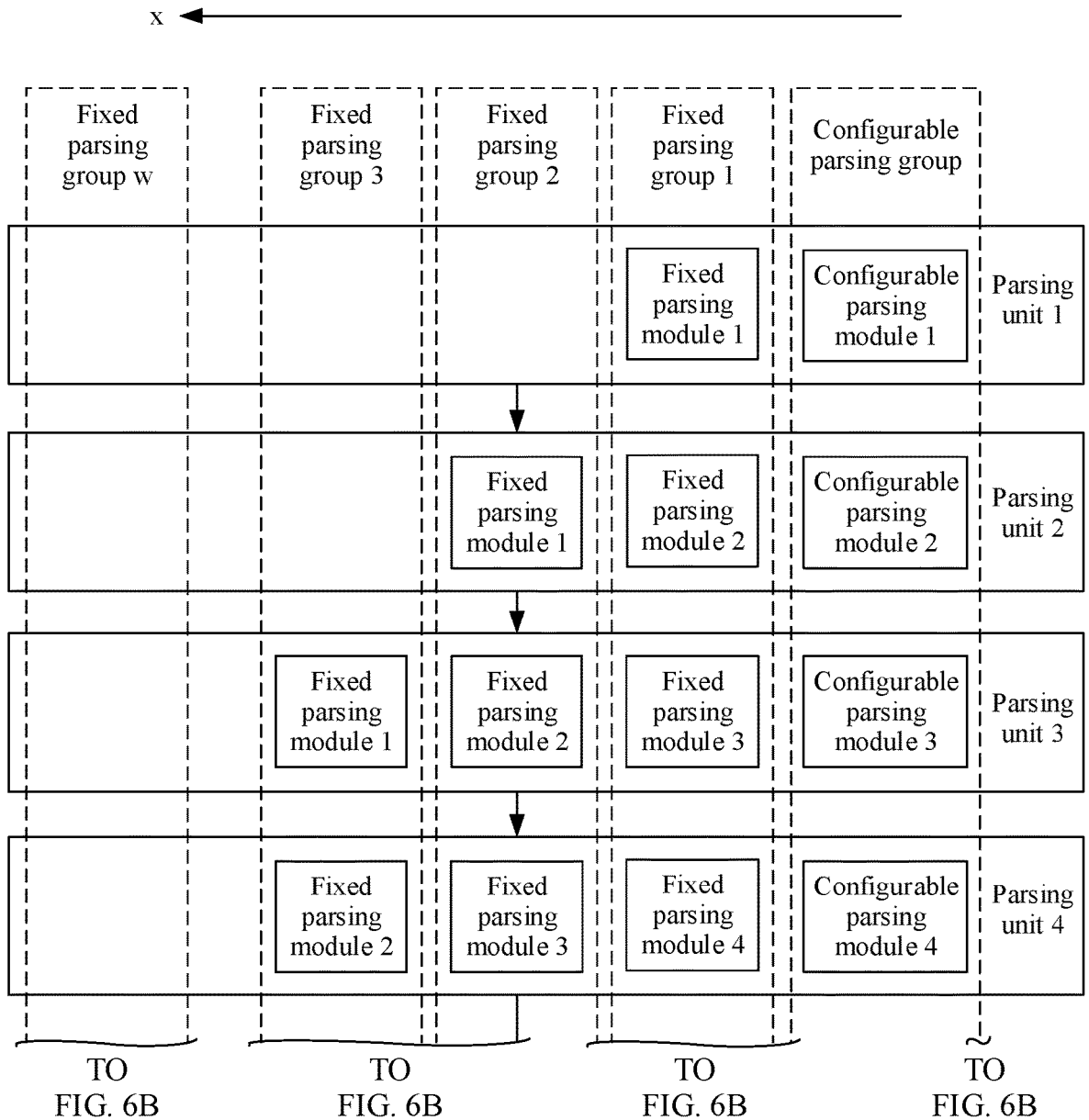
FIG. 6A and FIG. 6B are a schematic diagram of a structure of another parsing component according to an embodiment of this application.
Figure 6B:
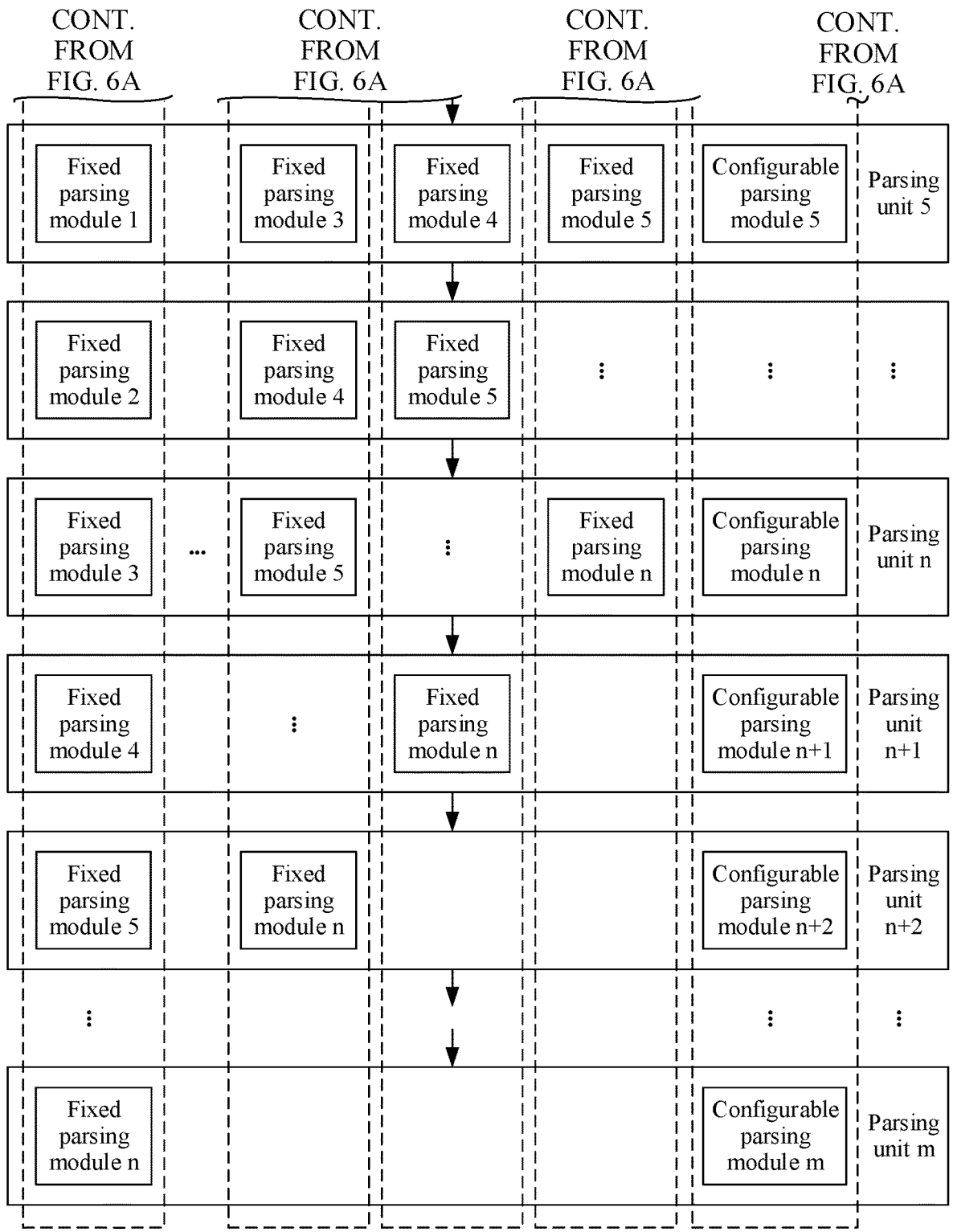

In an optional embodiment, an architecture of the parsing component is a pipeline architecture. As shown in FIG. 5, the m parsing units in the parsing component are sequentially connected, and the m parsing units each include a fixed parsing module. In an example, FIG. 6A and FIG. 6B are a schematic diagram of a structure of another parsing component according to an embodiment of this application. As shown in FIG. 6A and FIG. 6B, fixed parsing modules in m parsing units form w fixed parsing groups, where w is a positive integer. An architecture of each fixed parsing group in the w fixed parsing groups may be a pipeline architecture, each fixed parsing group in the w fixed parsing groups includes n fixed parsing modules, and the n fixed parsing modules are in a one-to-one correspondence with n protocol layers. An $i^{th}$ fixed parsing module in the n fixed parsing modules stores fixed protocol content of an $i^{th}$ protocol layer, an $(i-1)^{th}$ fixed parsing module in the n fixed parsing modules stores a fixed protocol type of the $i^{th}$ protocol layer, the $i^{th}$ fixed parsing module corresponds to the $i^{th}$ protocol layer, the $i^{th}$ protocol layer is any protocol layer in the n protocol layers, $1<i\le n$, and i is a positive integer. Optionally, the $i^{th}$ fixed parsing module in the n fixed parsing modules stores a fixed protocol type of an $(i+1)^{th}$ protocol layer, and the $(i-1)^{th}$ fixed parsing module in the n fixed parsing modules stores fixed protocol content of an $(i-1)^{th}$ protocol layer. In other words, in this embodiment of this application, a fixed parsing module corresponding to each protocol layer stores fixed protocol content of the protocol layer and a fixed protocol type of a next protocol layer of the protocol layer.

In the parsing component shown in FIG. 6A and FIG. 6B, the m parsing units are sequentially connected, so that in the w fixed parsing groups including the fixed parsing modules in the m parsing units, the n fixed parsing modules in each fixed parsing group are sequentially connected. In this embodiment of this application, an example in which the w fixed parsing groups include a fixed parsing group 1 to a fixed parsing group w is used for description. The fixed parsing group 1 may be the first fixed parsing group, the fixed parsing group 2 may be the second fixed parsing group, the fixed parsing group 3 may be the third fixed parsing group, and by analogy, the fixed parsing group w may be a $w^{th}$ fixed parsing group. In this embodiment of this application, an example in which the n fixed parsing modules in each fixed parsing group include a fixed parsing module 1 to a fixed parsing module n is used for description. In each fixed parsing group, the fixed parsing module 1 may be the first fixed parsing module, and the fixed parsing module 2 may be the second fixed parsing module. By analogy, a fixed parsing module i-1 may be the $(i-1)^{th}$ fixed parsing module, a fixed parsing module i may be the $i^{th}$ fixed parsing module, and the fixed parsing module n may be an $n^{th}$ fixed parsing module. In this embodiment of this application, an example in which the n protocol layers include a protocol layer 1 to a protocol layer n is used for description. The protocol layer 1 may be the first protocol layer in the n protocol layers, and the protocol layer 2 may be the second protocol layer in the n protocol layers. By analogy, a protocol layer i-1 may be the $(i-1)^{th}$ protocol layer in the n protocol layers, a protocol layer i may be the $i^{th}$ protocol layer in the n protocol layers, and the protocol layer n may be an $n^{th}$ protocol layer in the n protocol layers. In each fixed parsing group, the first fixed parsing module (namely, the fixed parsing module 1) corresponds to the first protocol layer (namely, the protocol layer 1), and the first fixed parsing module stores fixed protocol content of the first protocol layer and a fixed protocol type of the second protocol layer (namely, the protocol layer 2); the second fixed parsing module (namely, the fixed parsing module 2) corresponds to the second protocol layer, and the second fixed parsing module stores fixed protocol content of the second protocol layer and a fixed protocol type of the third protocol layer (namely, the protocol layer 3); the third fixed parsing module (namely, the fixed parsing module 3) corresponds to the third protocol layer, and the third fixed parsing module stores fixed protocol content of the third protocol layer and a fixed protocol type of the fourth protocol layer (namely, the protocol layer 4). The rest can be deduced by analogy.

Figure 7:
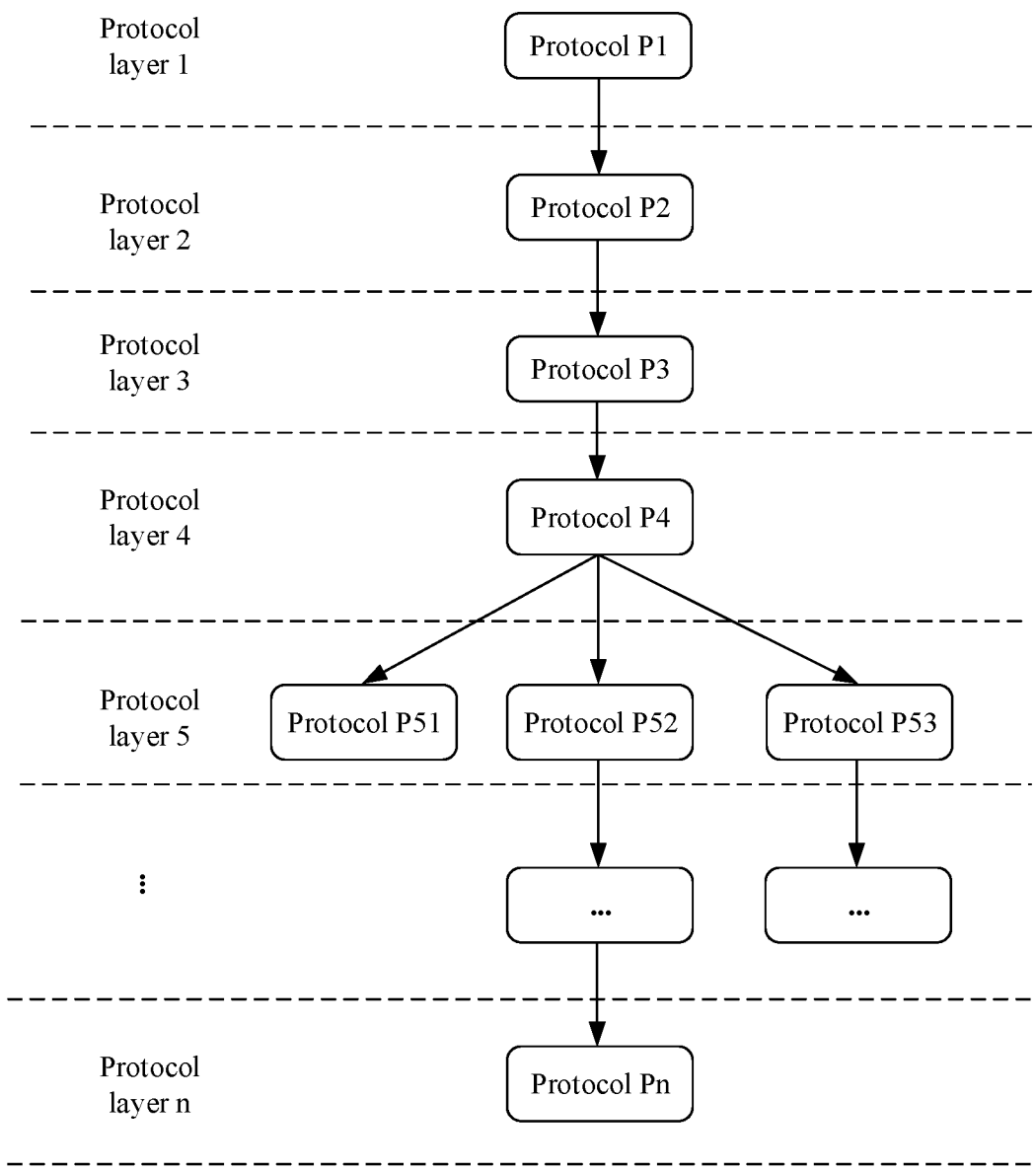
FIG. 7 is a schematic diagram of a structure of yet another protocol tree according to an embodiment of this application.

In an example of this application, FIG. 7 is a schematic diagram of a structure of a protocol tree according to an embodiment of this application. The protocol tree includes n protocol layers in total: a protocol layer 1 to a protocol layer n. The n fixed parsing modules in each fixed parsing group shown in FIG. 6A and FIG. 6B may be in a one-to-one correspondence with the n protocol layers shown in FIG. 7. As shown in FIG. 7, the protocol layer 1 includes a protocol P1, the protocol layer 2 includes a protocol P2, the protocol layer 3 includes a protocol P3, the protocol layer 4 includes a protocol P4, the protocol layer 5 includes a protocol P51, a protocol P52, and a protocol P53, and by analogy, the protocol layer n includes a protocol Pn. The protocol P1 can indicate the protocol P2. The protocol P2 can indicate the protocol P3. The protocol P3 can indicate the protocol P4. The protocol P4 can indicate the protocol P51, the protocol P52, and the protocol P53. In an optional embodiment, the protocol P1 is an ETH protocol, the protocol P2 and the protocol P3 are both VLAN protocols (where the protocol P2 and the protocol P3 may be specifically VLAN TAGs, and for example, the protocol P2 corresponds to TAG0, and the protocol P3 corresponds to TAG1), the protocol P4 is an IP protocol (for example, the IPv6 protocol or the IPv4 protocol), the protocol P51 is a transmission control protocol (TCP), the protocol P52 is a UDP, the protocol P53 is a generic routing encapsulation (GRE) protocol, and a next-layer protocol (a protocol in the protocol layer 6) of the protocol layer 5 may include a virtual extensible local area network (VXLAN) protocol, a network virtualization using generic routing encapsulation (NVGRE) protocol, and the like. In a specific example, the protocol tree is shown in FIG. 8.

Figure 8:
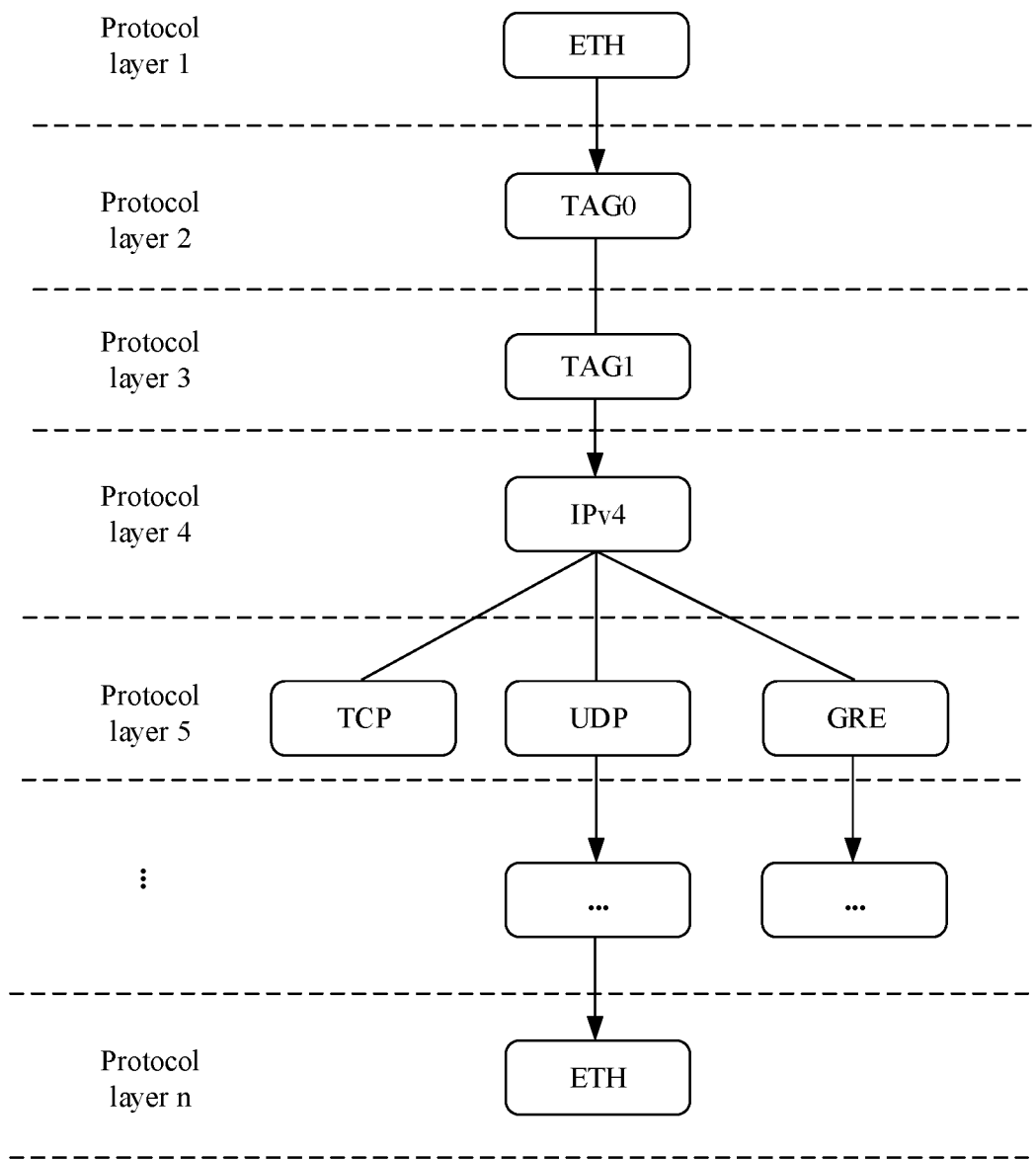
FIG. 8 is a schematic diagram of a structure of yet another protocol tree according to an embodiment of this application.

The protocol trees shown in FIG. 7 and FIG. 8 are merely used as examples in this application, and cannot be understood as a limitation on network protocols. During actual application, the protocol P1 can further indicate the protocol P2 and the protocol P4, the protocol P2 can further indicate the protocol P4, and protocols at different layers may be in another relationship. This is not limited in this embodiment of this application.

In this embodiment of this application, to help the parsing component support protocol layer extension among the n protocol layers, the w fixed parsing groups may be deployed in a staggered manner. For example, head ends of the w fixed parsing groups are distributed in a ladder shape, so that the w fixed parsing groups are deployed in the staggered manner. Because each of the w fixed parsing groups includes the n fixed parsing modules that are sequentially connected, architectures of the w fixed parsing groups are the same. When the head ends of the w fixed parsing groups are distributed in the ladder shape, tail ends of the w fixed parsing groups are also distributed in the ladder shape. A head end of each fixed parsing group is an end at which the first fixed parsing module in the fixed parsing group is located, and a tail end of each fixed parsing group is an end at which an $n^{th}$ fixed parsing module in the fixed parsing group is located. As described above, the architecture of the fixed parsing group may be the pipeline architecture. Therefore, in some embodiments, one fixed parsing group is referred to as one pipeline. In this case, the parsing component includes w pipelines, and the w pipelines may be deployed in the staggered manner. This is not limited in this embodiment of this application.

In an optional embodiment, as shown in FIG. 5 to FIG. 6B, the m parsing units each include a configurable parsing module. As shown in FIG. 6A and FIG. 6B, in the m parsing units, a $j^{th}$ parsing unit includes a $j^{th}$ configurable parsing module and an $i^{th}$ fixed parsing module in a $k^{th}$ fixed parsing group, and a $(j-1)^{th}$ parsing unit includes a $(j-1)^{th}$ configurable parsing module and an $(i-1)^{th}$ fixed parsing module in the $k^{th}$ fixed parsing group, where 1<j≤m, 1≤k≤w, both k and j are integers, and i takes all values in a range [1, j]. The $j^{th}$ configurable parsing module is configured to configure protocol content of a target protocol layer in the $j^{th}$ configurable parsing module based on obtained content configuration information of the target protocol layer. The $(j-1)^{th}$ configurable parsing module is configured to configure a protocol type of the target protocol layer in the $(j-1)^{th}$ configurable parsing module based on obtained type configuration information of the target protocol layer. The target protocol layer is the $i^{th}$ protocol layer, in other words, the $j^{th}$ configurable parsing module and the $(j-1)^{th}$ configurable parsing module enable the parsing component to support protocol content extension at the $i^{th}$ protocol layer. Alternatively, the target protocol layer is a protocol layer inserted between the $i^{th}$ protocol layer and the $(i+1)^{th}$ protocol layer, in other words, the $j^{th}$ configurable parsing module and the $(j-1)^{th}$ configurable parsing module enable the parsing component to support protocol layer insertion between the $i^{th}$ protocol layer and the $(i+1)^{th}$ protocol layer.

In an optional embodiment, j=i+s×(k−1), where i takes all the values in the range [1, j], and s is determined based on an arrangement of the w fixed parsing groups. For example, s=1, and j=i+k−1. As described above, in the m parsing units, the $j^{th}$ parsing unit includes the $j^{th}$ configurable parsing module and the $i^{th}$ fixed parsing module in the $k^{th}$ fixed parsing group, and the $(j-1)^{th}$ parsing unit includes the $(j-1)^{th}$ configurable parsing module and the $(i-1)^{th}$ fixed parsing module in the $k^{th}$ fixed parsing group. For example, with reference to FIG. 6A and FIG. 6B, the first parsing unit (namely, a parsing unit 1) includes the first configurable parsing module (namely, a configurable parsing module 1) and the first fixed parsing module (namely, a fixed parsing module 1) in the first fixed parsing group (namely, the fixed parsing group 1); the second parsing unit (namely, a parsing unit 2) includes the second configurable parsing module (namely, a configurable parsing module 2), the second fixed parsing module (namely, a fixed parsing module 2) in the first fixed parsing group (namely, the fixed parsing group 1), and the first fixed parsing module (namely, a fixed parsing module 1) in the second fixed parsing group (namely, the fixed parsing group 2); the third parsing unit (namely, a parsing unit 3) includes the third configurable parsing module (namely, a configurable parsing module 3), the third fixed parsing module (namely, a fixed parsing module 3) in the first fixed parsing group (namely, the fixed parsing group 1), the second fixed parsing module (namely, a fixed parsing module 2) in the second fixed parsing group (namely, the fixed parsing group 2), and the first fixed parsing module (namely, a fixed parsing module 1) in the third fixed parsing group (namely, the fixed parsing group 3); the fourth parsing unit (namely, a parsing unit 4) includes the fourth configurable parsing module (namely, a configurable parsing module 4), the fourth fixed parsing module (namely, a fixed parsing module 4) in the first fixed parsing group (namely, the fixed parsing group 1), the third fixed parsing module (namely, a fixed parsing module 3) in the second fixed parsing group (namely, the fixed parsing group 2), and the second fixed parsing module (namely, a fixed parsing module 2) in the third fixed parsing group (namely, the fixed parsing group 3). The rest can be deduced by analogy.

As shown in FIG. 6A and FIG. 6B, the w fixed parsing groups are arranged in an array along a first direction x, each of the w fixed parsing groups includes one first fixed parsing module (for example, the fixed parsing module 1), the w fixed parsing groups include w first fixed parsing modules in total, and the w first fixed parsing modules belong to w parsing units in the m parsing units. For any two adjacent fixed parsing groups in the w fixed parsing groups, there is an interval of s−1 parsing units between two parsing units to which two first fixed parsing modules in the two fixed parsing groups belong. Optionally, the m parsing units are sequentially connected, and the w parsing units are w parsing units located at the forefront in the m parsing units. For example, when s=1, the w parsing units are the parsing unit 1 to a parsing unit w that are located at the forefront in the m parsing units, and two parsing units to which two first fixed parsing modules in any two adjacent fixed parsing groups in the w fixed parsing groups belong are adjacent. For example, as shown in FIG. 6A and FIG. 6B, the fixed parsing group 1 is adjacent to the fixed parsing group 2, the fixed parsing module 1 (namely, the first fixed parsing module) in the fixed parsing group 1 belongs to the parsing unit 1, the fixed parsing module 1 (namely, the first fixed parsing module) in the fixed parsing group 2 belongs to the parsing unit 2, and the parsing unit 1 is adjacent to the parsing unit 2. For another example, the fixed parsing group 2 is adjacent to the fixed parsing group 3, the fixed parsing module 1 (namely, the first fixed parsing module) in the fixed parsing group 2 belongs to the parsing unit 2, the fixed parsing module 1 (namely, the first fixed parsing module) in the fixed parsing group 3 belongs to the parsing unit 3, and the parsing unit 2 is adjacent to the parsing unit 3.

In an optional embodiment, the $k^{th}$ fixed parsing group, a $(k+1)^{th}$ fixed parsing group, and a $(k+2)^{th}$ fixed parsing group are any three adjacent fixed parsing groups in the w fixed parsing groups. For the $k^{th}$ fixed parsing group, the $(k+1)^{th}$ fixed parsing group, and the $(k+2)^{th}$ fixed parsing group, a parsing unit to which the first fixed parsing module (namely, a fixed parsing module 1) in the $(k+1)^{th}$ fixed parsing group belongs is located after a parsing unit to which the first fixed parsing module (namely, a fixed parsing module 1) in the $k^{th}$ fixed parsing group belongs, and a parsing unit to which the first fixed parsing module (namely, a fixed parsing module 1) in the $(k+2)^{th}$ fixed parsing group belongs is located after the parsing unit to which the first fixed parsing module (namely, the fixed parsing module 1) in the $(k+1)^{th}$ fixed parsing group belongs. For example, k=1. As shown in FIG. 6A and FIG. 6B, the parsing unit 2 to which the first fixed parsing module in the second fixed parsing group (for example, the fixed parsing module 1 in the fixed parsing group 2) belongs is located after the parsing unit 1 to which the first fixed parsing module in the first fixed parsing group (for example, the fixed parsing module 1 in the fixed parsing group 1) belongs, and the parsing unit 3 to which the first fixed parsing module in the third fixed parsing group (for example, the fixed parsing module 1 in the fixed parsing group 3) belongs is located after the parsing unit 2 to which the first fixed parsing module in the second fixed parsing group (for example, the fixed parsing module 1 in the fixed parsing group 2) belongs.

In an optional embodiment, a configurable parsing module in the m parsing units forms a configurable parsing group, and the first direction x is a direction from approaching the configurable parsing group to being away from the configurable parsing group. In the w fixed parsing groups, a fixed parsing group closest to the configurable parsing group is the first fixed parsing group (namely, the fixed parsing group 1), and a fixed parsing group farthest from the configurable parsing group is the $w^{th}$ fixed parsing group (namely, the fixed parsing group w), so that the w fixed parsing groups are arranged in an array in the direction from approaching the configurable parsing group to being away from the configurable parsing group, and the head ends of the w fixed parsing groups are arranged in the ladder shape in the direction from approaching the configurable parsing group to being away from the configurable parsing group.

Optionally, as shown in FIG. 6A and FIG. 6B, the first configurable parsing module in the configurable parsing group and the first fixed parsing module in the first fixed parsing group belong to a same parsing unit. For example, both the configurable parsing module 1 in the configurable parsing group and the fixed parsing module in the fixed parsing group 1 belong to the parsing unit.

In an optional embodiment, the fixed parsing module and the configurable parsing module each include a switch element (which is not shown in FIG. 5 to FIG. 6B for brevity), and the switch element in each parsing module in the fixed parsing module and the configurable parsing module is configured to control an enabled/disabled state of the parsing module. Each parsing module in the fixed parsing module and the configurable parsing module is configured to: when the parsing module is in an enabled state, parse, based on protocol content in the parsing module, a packet input into the parsing module. The switch element may be a hardware switch component or a software switch module, and a status of the switch element may be configured. For example, the switch element may be enabled or disabled based on an obtained switch configuration signal, and the switch configuration signal may be sent by the controller to the switch element. When the switch element is enabled, the parsing module in which the switch element is located is in the enabled state, and the parsing module can parse, based on the protocol content in the parsing module, the packet input into the parsing module. When the switch element is disabled, the parsing module in which the switch element is located is in a disabled state, and the parsing module does not parse the packet input into the parsing module, or the parsing module does not receive the input packet. This is not limited in this embodiment of this application.

A packet parsing process usually includes a protocol extraction process and a protocol matching process. The protocol extraction process refers to a process of extracting protocol information from a packet. The protocol matching process refers to a process of performing matching on the protocol information extracted from the packet and protocol content. The fixed parsing module and the configurable parsing module each may be a matching module, for example, a content addressable memory (CAM) matching module. Each parsing module in the fixed parsing module and the configurable parsing module may be specifically configured to perform matching on protocol information extracted from the packet and the protocol content in the parsing module. In an optional embodiment, the parsing unit in this embodiment of this application further includes an extraction module (where the extraction module is not shown in FIG. 5 to FIG. 6B for brevity), configured to extract protocol information from a packet input into the parsing unit.

Figure 9:
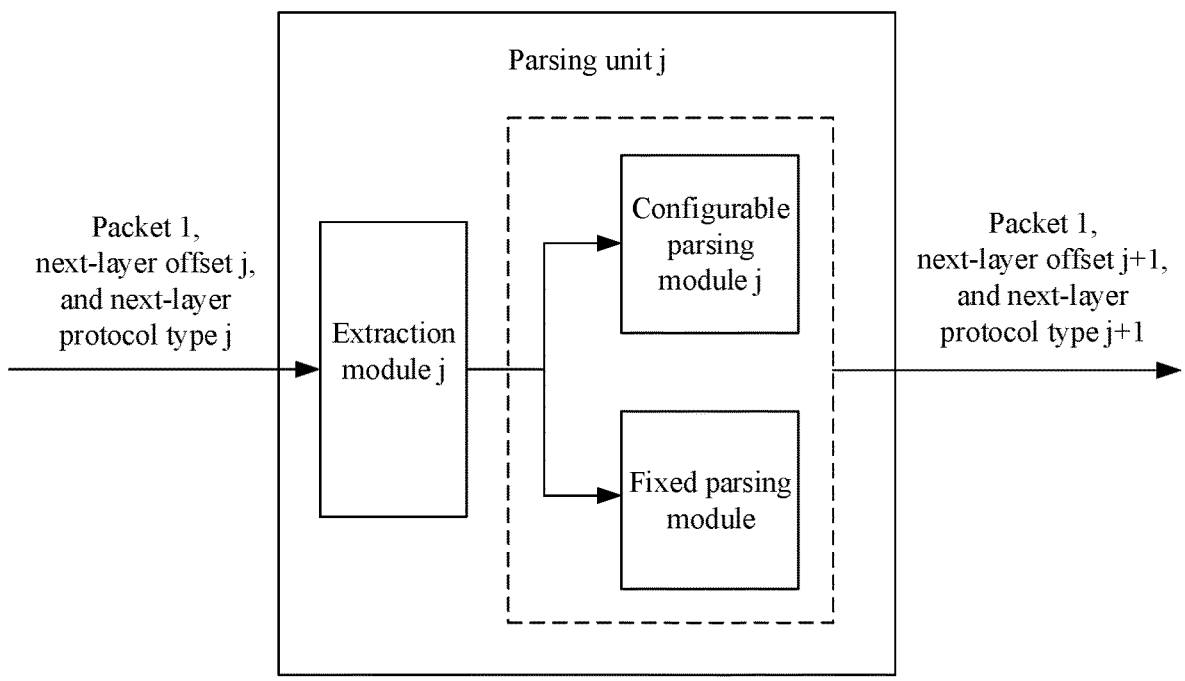
FIG. 9 is a schematic diagram of a structure of a parsing unit according to an embodiment of this application.

In this embodiment of this application, an example in which the m parsing units each include an extraction module is used for description. FIG. 9 is a schematic diagram of a structure of a parsing unit according to an embodiment of this application. In FIG. 9, an example in which the parsing unit is a parsing unit j in the m parsing units is used for description. The parsing unit j includes an extraction module j, a configurable parsing module j, and a fixed parsing module. The extraction module j is connected to the configurable parsing module j and the fixed parsing module. The fixed parsing module in the parsing unit j shown in FIG. 9 represents all fixed parsing modules in the parsing unit j. For example, when j=1, the parsing unit j is the parsing unit 1 in FIG. 6A, and the fixed parsing module in the parsing unit j represents the fixed parsing module 1 in the parsing unit 1. When j=2, the parsing unit j is the parsing unit 2 in FIG. 6A, and the fixed parsing module in the parsing unit j represents the fixed parsing module 1 and the fixed parsing module 2 in the parsing unit 2. The rest can be deduced by analogy. As shown in FIG. 9, an example in which the parsing component parses a packet 1 is used for description. A previous parsing unit (for example, a parsing unit j−1) of the parsing unit j may transmit the packet 1, a next-layer protocol type j, and a next-layer offset j to the parsing unit j. The next-layer protocol type j is a protocol type that is of a next protocol layer (for example, a protocol layer j) of a protocol layer (for example, a protocol layer j−1) corresponding to the parsing unit j−1 and that is determined by the parsing unit j−1 by parsing the packet 1, and the offset j is a value of an offset field extracted by the parsing unit j−1 from a packet header j−1 (which refers to a packet header corresponding to the protocol layer j−1 in the packet 1) of the packet 1. After the parsing unit j receives the packet 1, the next-layer protocol type j, and the next-layer offset j, the extraction module j in the parsing unit j determines, in the packet 1 based on the next-layer protocol type j, a packet header (for example, a packet header j) corresponding to the next-layer protocol type j, and extracts protocol information from the packet header j based on the next-layer offset j (for ease of description, the protocol information extracted from the packet header j is referred to as protocol information j). Then, the extraction module j in the parsing unit j transmits both the packet 1 and the protocol information j extracted from the packet 1 to the configurable parsing module j and the fixed parsing module in the parsing unit j. After receiving the packet 1 and the protocol information j, the configurable parsing module j performs matching on the protocol information j and protocol content in the configurable parsing module j, and determines that the protocol information j matches protocol content j+1 in the configurable parsing module j. The configurable parsing module j determines a next-layer protocol type j+1 (in other words, a protocol type of a next protocol layer of a protocol layer corresponding to the parsing unit j) based on the protocol content j+1, and extracts a value of an offset field (where the value of the offset field is a next-layer offset j+1) from the packet header j. In this way, the configurable parsing module j successfully parses the packet 1. Similarly, after receiving the packet 1 and the protocol information j, the fixed parsing module performs matching on the protocol information j and protocol content in the fixed parsing module, and determines that the protocol information j matches the protocol content j+1 in the fixed parsing module. The fixed parsing module determines the next-layer protocol type j+1 (in other words, the protocol type of the next protocol layer of the protocol layer corresponding to the parsing unit j) based on the protocol content j+1, and extracts the value of the offset field (where the value of the offset field is the next-layer offset j+1) from the packet header j. In this way, the fixed parsing module successfully parses the packet 1. The parsing unit j outputs a final parsing result to a next parsing unit (for example, a parsing unit j+1) of the parsing unit j based on a parsing result of the configurable parsing module j and a parsing result of the fixed parsing module. For example, if the configurable parsing module j successfully parses the packet 1, the parsing unit j uses the parsing result of the configurable parsing module j as the final parsing result and outputs the final parsing result to the parsing unit j+1. If the configurable parsing module j fails to parse the packet 1, but the fixed parsing module successfully parses the packet 1, the parsing unit j may use the parsing result of the fixed parsing module as the final parsing result and output the final parsing result to the parsing unit j+1. If both the configurable parsing module j and the fixed parsing module fail to parse the packet 1, the parsing unit j terminates a parsing process.

The parsing component usually parses packet headers in a packet in an order from an outermost layer to an innermost layer, and each layer of packet header in the packet corresponds to one protocol layer. For example, in the m parsing units in the parsing component, the first parsing unit (namely, the parsing unit 1) usually parses an outermost packet header of the packet (for example, the packet 1). Before the parsing unit 1 parses the packet, the parsing component may perform initialization, to initialize both a next-layer protocol type and a next-layer offset to initial values. For example, the next-layer protocol type is initialized to an ETH type, and the next-layer offset is initialized to 0. When the parsing unit 1 parses the packet, a used next-layer protocol type is an initialized protocol type, and a used next-layer offset is an initialized offset. In addition, in this embodiment of this application, an example in which content transmitted between parsing units includes a packet is used for description. In a process in which the parsing unit parses the packet, usually, only content in a packet header needs to be used. Therefore, in some embodiments, after receiving the packet, the network device may extract all or a part of packet headers from the packet (for example, extract a part other than a packet body from the packet), and provide the extracted packet header to the parsing component for parsing. In this way, transmission of the entire packet between the parsing units can be avoided, and transmission power consumption of the parsing component can be reduced.

In the parsing component provided in this embodiment of this application, each parsing unit in the m parsing units may include a fixed parsing module and a configurable parsing module. In this way, each parsing unit has both a fixed parsing function and a protocol configuration capability, each parsing unit can support protocol extension and/or modification, and the scalability of the parsing component is high. For example, resources in all or a part of configurable parsing modules in the m parsing units may be reserved, and when protocol extension needs to be performed, extended protocol content may be configured in the reserved configurable parsing module, so that the parsing component can support protocol extension.

During design of the parsing component provided in this embodiment of this application, first, a fixed parsing group (for example, the fixed parsing group 1 in FIG. 6A and FIG. 6B) is designed based on parsing requirements of specific network protocols (for example, the protocol tree shown in FIG. 7). The fixed parsing group 1 includes n fixed parsing modules that are sequentially connected, and the n fixed parsing modules are in a one-to-one correspondence with n protocol layers in the network protocols. Then, a parsing function of a corresponding fixed parsing module is determined based on a parsing requirement of each protocol layer, and fixed protocol content of the corresponding protocol layer is stored in each fixed parsing module. Then, a quantity w of fixed parsing groups and a quantity m of configurable parsing modules are determined based on an evaluation of an extension requirement of the forwarding chip. Then, the fixed parsing group 1 is replicated based on the quantity w of fixed parsing groups to obtain the fixed parsing group 2 to the fixed parsing group w, one configurable parsing group is determined based on m configurable parsing modules, and the w fixed parsing groups are designed to be arranged in an array in a direction away from the configurable parsing group. In this way, the parsing component shown in FIG. 6A and FIG. 6B is obtained. The parsing component includes the m parsing units that are sequentially connected, each parsing unit in the m parsing units includes one configurable parsing module and at least one fixed parsing module, and each parsing unit includes a fixed parsing module in at least one parsing unit before the parsing unit. In this embodiment of this application, an example in which each parsing unit includes one configurable parsing module is used for description. In another embodiment, one parsing unit may include a plurality of configurable parsing modules. A quantity of configurable parsing modules included in the parsing unit is not limited in this embodiment of this application.

Figure 10A:
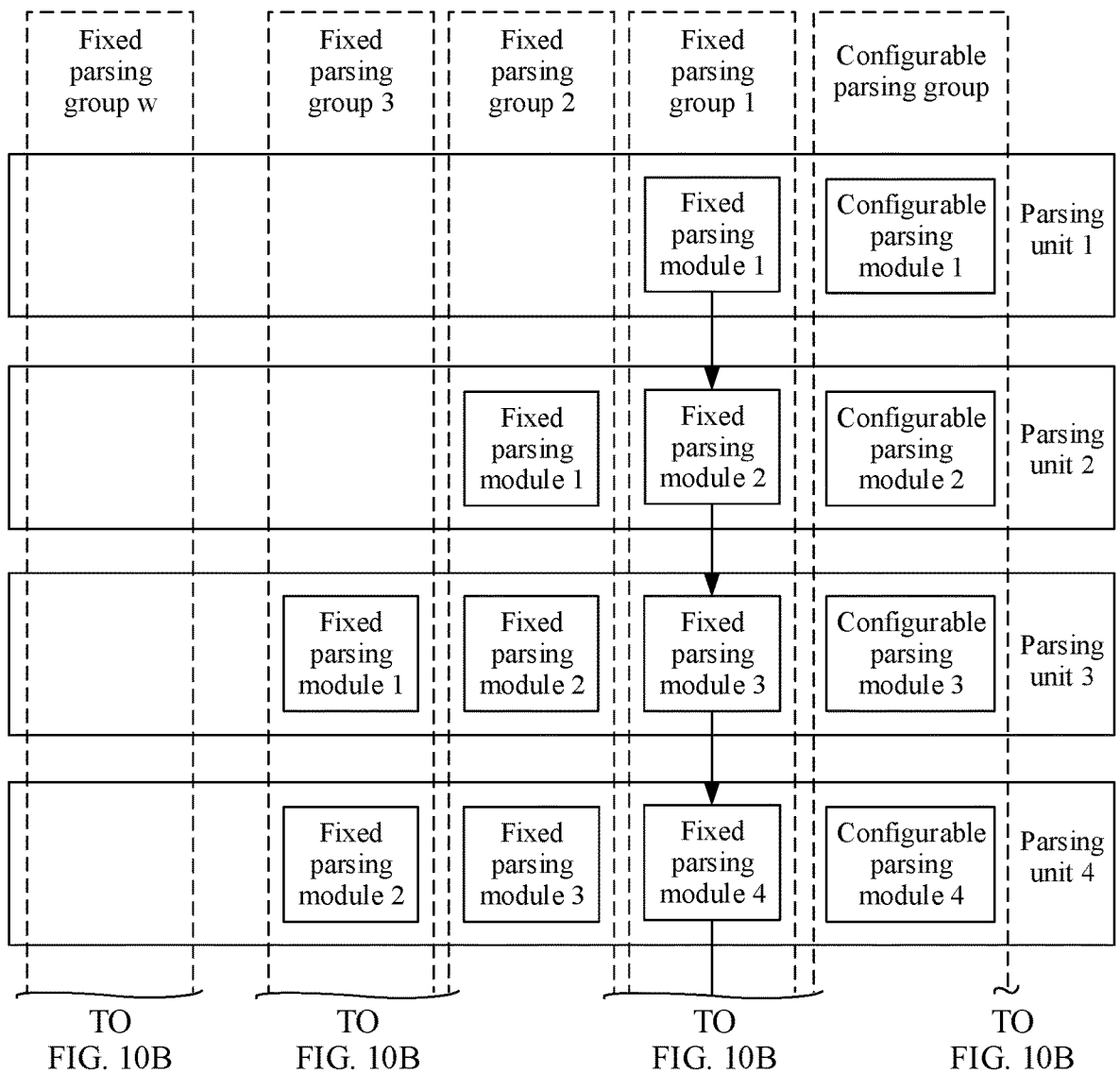
FIG. 10A and FIG. 10B are a schematic working diagram of a parsing component according to an embodiment of this application.
Figure 10B:
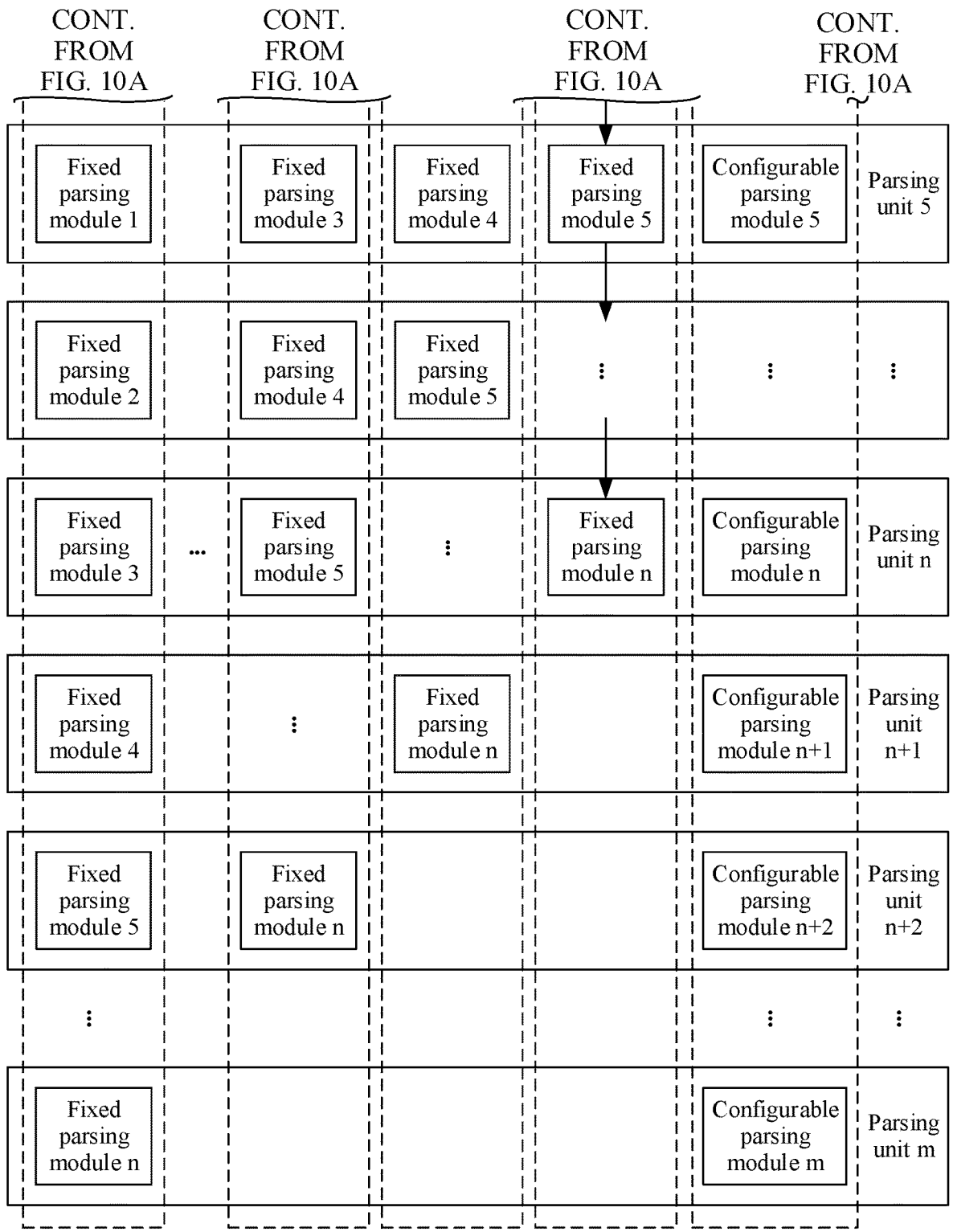

The protocol tree shown in FIG. 7 may be a protocol tree of specific network protocols. When there is no protocol extension, only the fixed parsing group 1 in the parsing component shown in FIG. 6A and FIG. 6B may be enabled to parse the packet based on the network protocols shown in FIG. 7. In this case, a working procedure of the parsing component may be shown in FIG. 10A and FIG. 10B. The fixed parsing module 1 to the fixed parsing module n in the fixed parsing group 1 are all in an enabled state, and other fixed parsing modules and configurable parsing modules are all in a disabled state. The fixed parsing module 1 to the fixed parsing module n in the fixed parsing group 1 sequentially parse the packet.

The parsing component shown in FIG. 6A and FIG. 6B may support protocol content extension at an original protocol layer, and may also support protocol layer extension between different original protocol layers. The following separately describes the two cases with reference to the accompanying drawings.

Case 1: Protocol Content Extension at an Original Protocol Layer.

Figure 11:
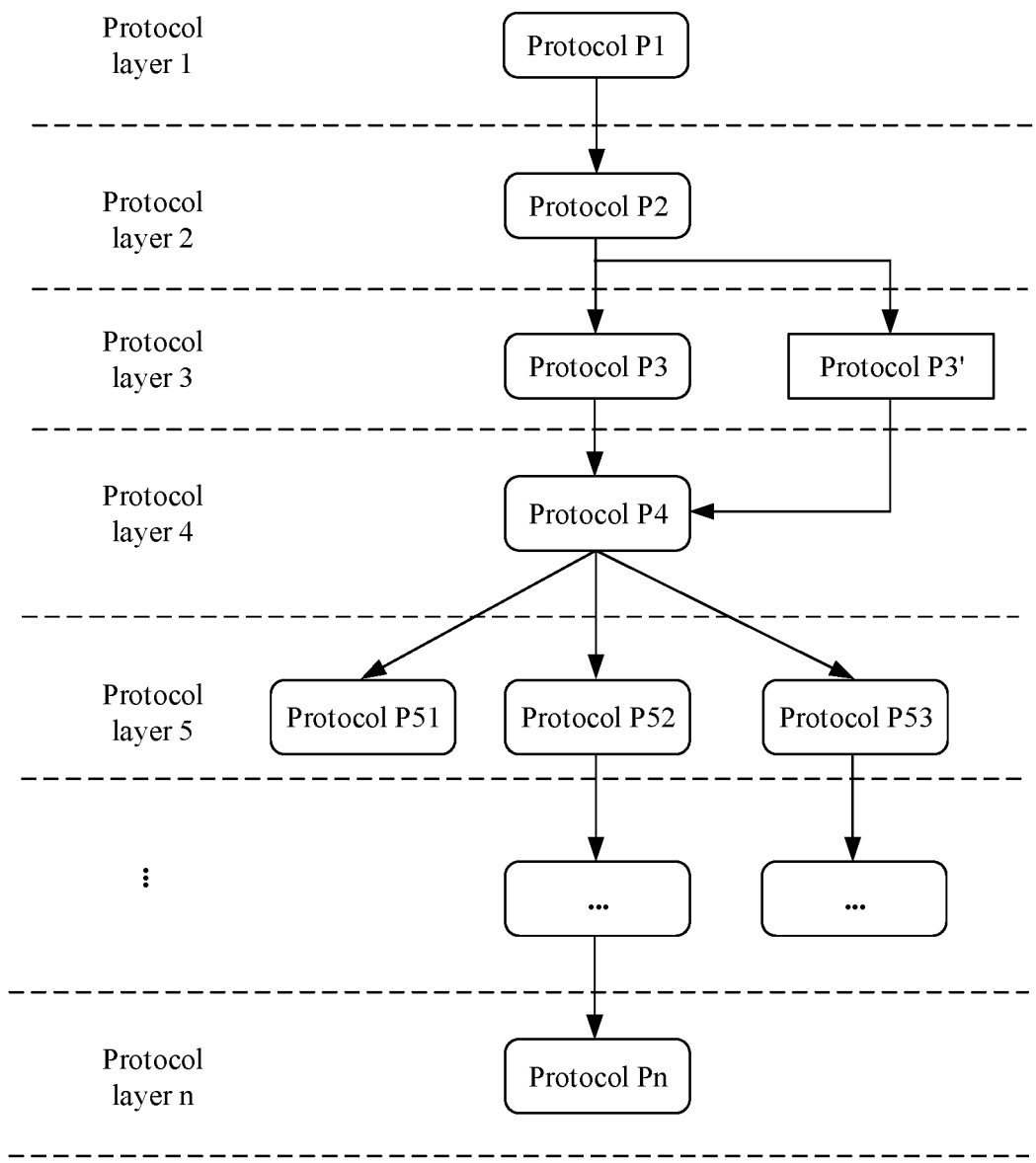
FIG. 11 is a schematic diagram of a structure of yet another protocol tree according to an embodiment of this application.

For example, when a new protocol P3' needs to be added to the protocol layer 3 shown in FIG. 7 due to a protocol evolution requirement, the protocol tree shown in FIG. 7 is evolved into a protocol tree shown in FIG. 11. For the protocol tree shown in FIG. 11, first, the configurable parsing module 3 corresponding to the protocol layer 3 is determined in the parsing component shown in FIG. 6A and FIG. 6B, protocol content of the protocol P3' is configured in the configurable parsing module 3, and a protocol type of the protocol P3' is configured in the configurable parsing module 2 corresponding to the protocol layer 2 (a previous protocol layer of the protocol layer 3). Then, the configurable parsing module 2, the configurable parsing module 3, and the fixed parsing module 1 to the fixed parsing module n in the fixed parsing group 1 are controlled to be in an enabled state, and other fixed parsing modules and configurable parsing modules are controlled to be in a disabled state, so that the configurable parsing module 2, the configurable parsing module 3, and the fixed parsing module 1 to the fixed parsing module n in the fixed parsing group 1 parse the packet input into the parsing component. In this case, a working procedure of the parsing component is shown in FIG. 12A and FIG. 12B.

Figure 12A:
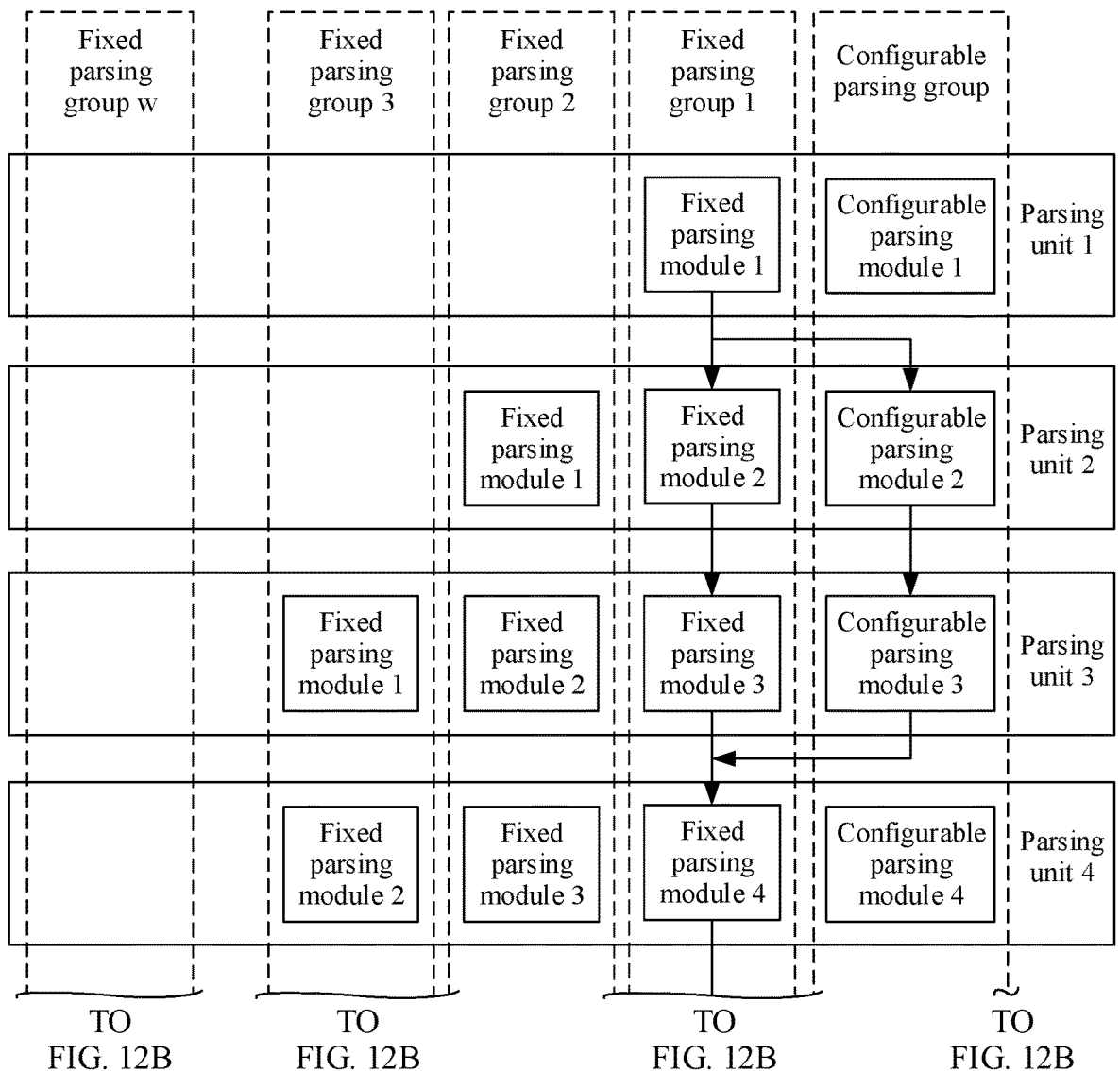
FIG. 12A and FIG. 12B are a schematic working diagram of another parsing component according to an embodiment of this application.
Figure 12B:
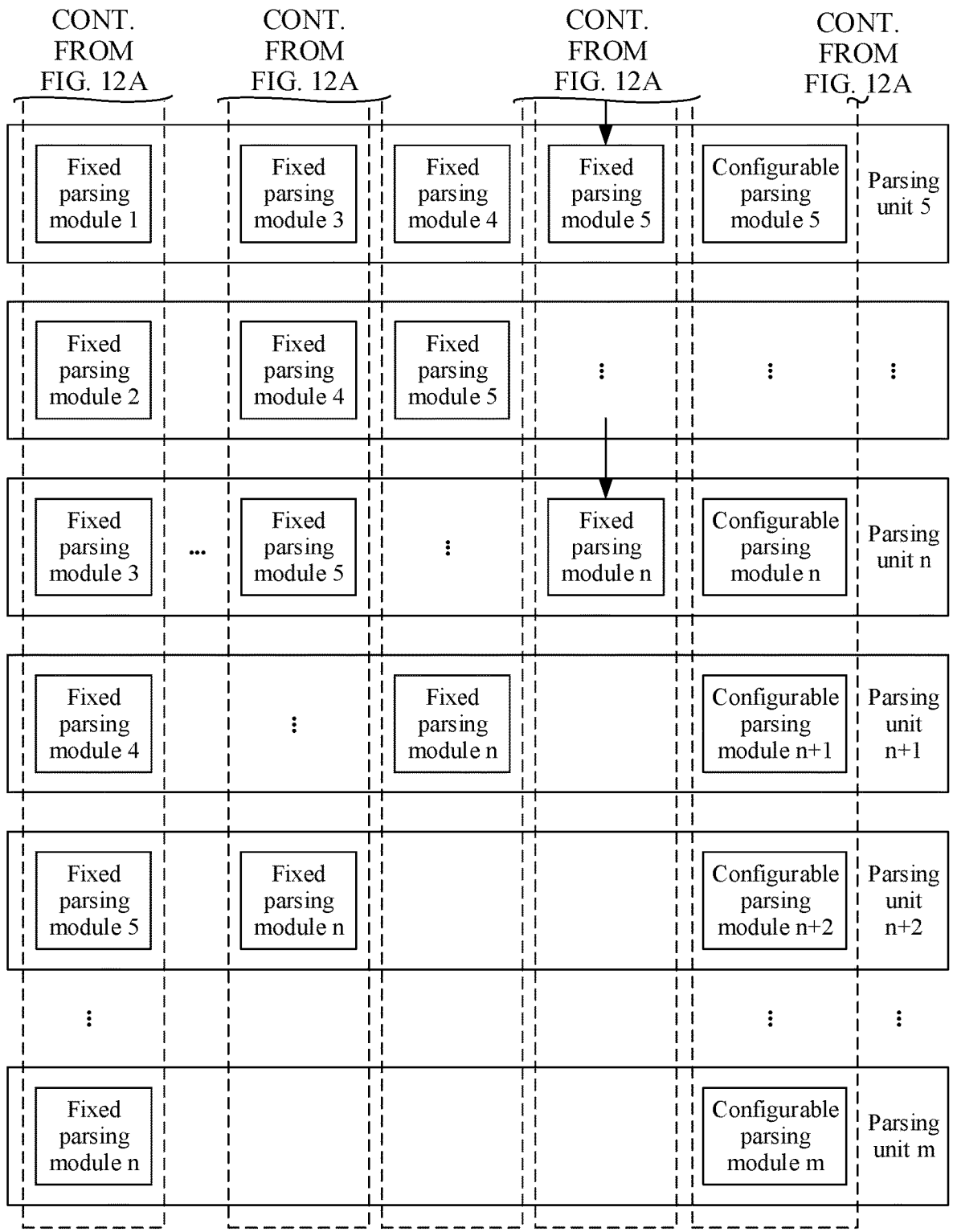

With reference to FIG. 12A and FIG. 12B, the fixed parsing module 1 in the parsing unit 1 first parses the packet (for example, the packet 1) input into the parsing component. After the fixed parsing module 1 in the parsing unit 1 successfully parses the packet 1, the fixed parsing module 2 and the configurable parsing module 2 in the parsing unit 2 separately parse the packet 1. If the configurable parsing module 2 successfully parses the packet 1, the parsing unit 2 determines that the packet 1 is a packet based on the newly added protocol P3', and then the configurable parsing module 3 in the parsing unit 3 parses the packet 1. After the configurable parsing module 3 in the parsing unit 3 successfully parses the packet 1, the fixed parsing module 4 to the fixed parsing module n in the fixed parsing group 1 sequentially parse the packet 1. If the fixed parsing module 2 in the parsing unit 2 successfully parses the packet 1, the configurable parsing module 2 fails to parse the packet 1, and the parsing unit 2 determines that the packet 1 is a packet based on the original protocol P3. Then, the fixed parsing module 3 to the fixed parsing module n in the fixed parsing group 1 sequentially parse the packet 1.

Case 2: Protocol Layer Extension Between Different Original Protocol Layers.

Figure 13:
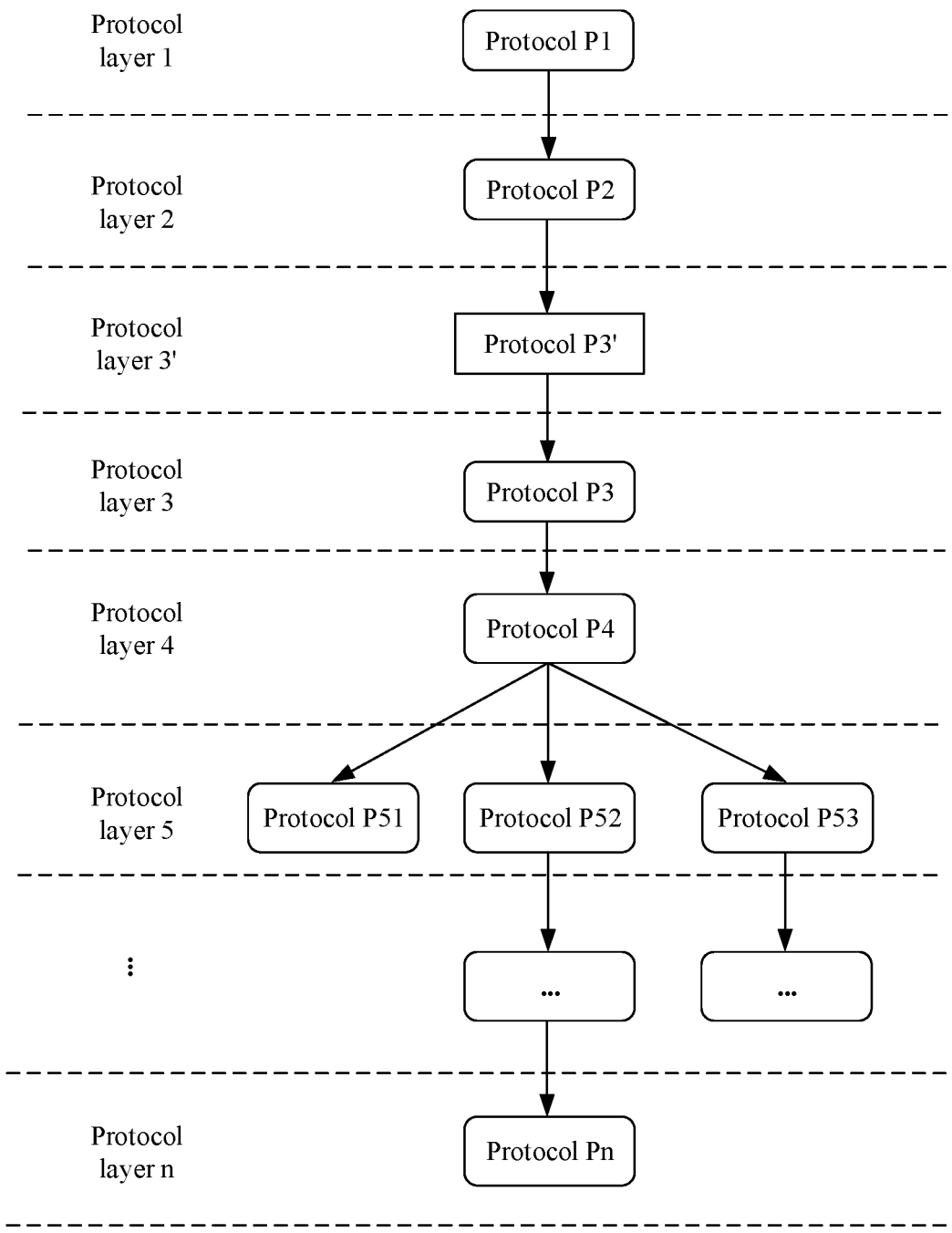
FIG. 13 is a schematic diagram of a structure of yet another protocol tree according to an embodiment of this application.

For example, when a new protocol layer 3' needs to be added between the protocol layer 2 and the protocol layer 3 shown in FIG. 7 due to a protocol evolution requirement, the protocol tree shown in FIG. 7 is evolved into a protocol tree shown in FIG. 13, and the protocol layer 3' includes a protocol P3'. For the protocol tree shown in FIG. 13, first, the configurable parsing module 2 corresponding to the protocol layer 2 and the configurable parsing module 3 corresponding to the protocol layer 3 are determined in the parsing component shown in FIG. 6A and FIG. 6B, protocol content of the protocol P3' is configured in the configurable parsing module 3, and a protocol type of the protocol P3' is configured in the configurable parsing module 2. Then, the configurable parsing module 2, the configurable parsing module 3, the fixed parsing module 1 and the fixed parsing module 2 in the fixed parsing group 1, and the fixed parsing module 3 to a fixed parsing module n in the fixed parsing group 2 are controlled to be in an enabled state, and other fixed parsing modules and configurable parsing modules are controlled to be in a disabled state, so that the configurable parsing module 2, the configurable parsing module 3, the fixed parsing module 1 and the fixed parsing module 2 in the fixed parsing group 1, and the fixed parsing module 3 to the fixed parsing module n in the fixed parsing group 2 parse the packet input into the parsing component. In this case, a working procedure of the parsing component may be shown in FIG. 14A and FIG. 14B.

Figure 14A:
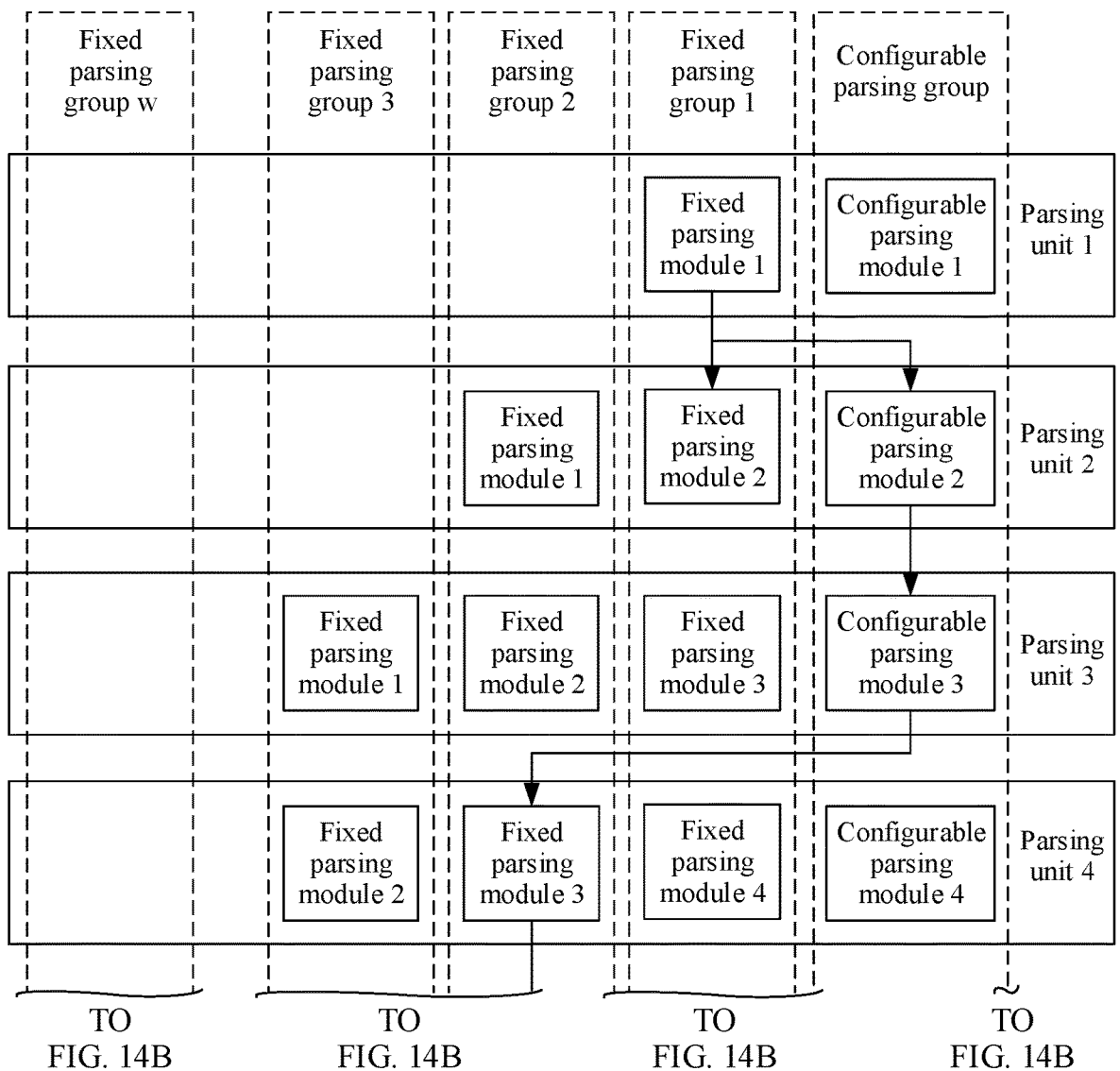
FIG. 14A and FIG. 14B are a schematic working diagram of still another parsing component according to an embodiment of this application.
Figure 14B:
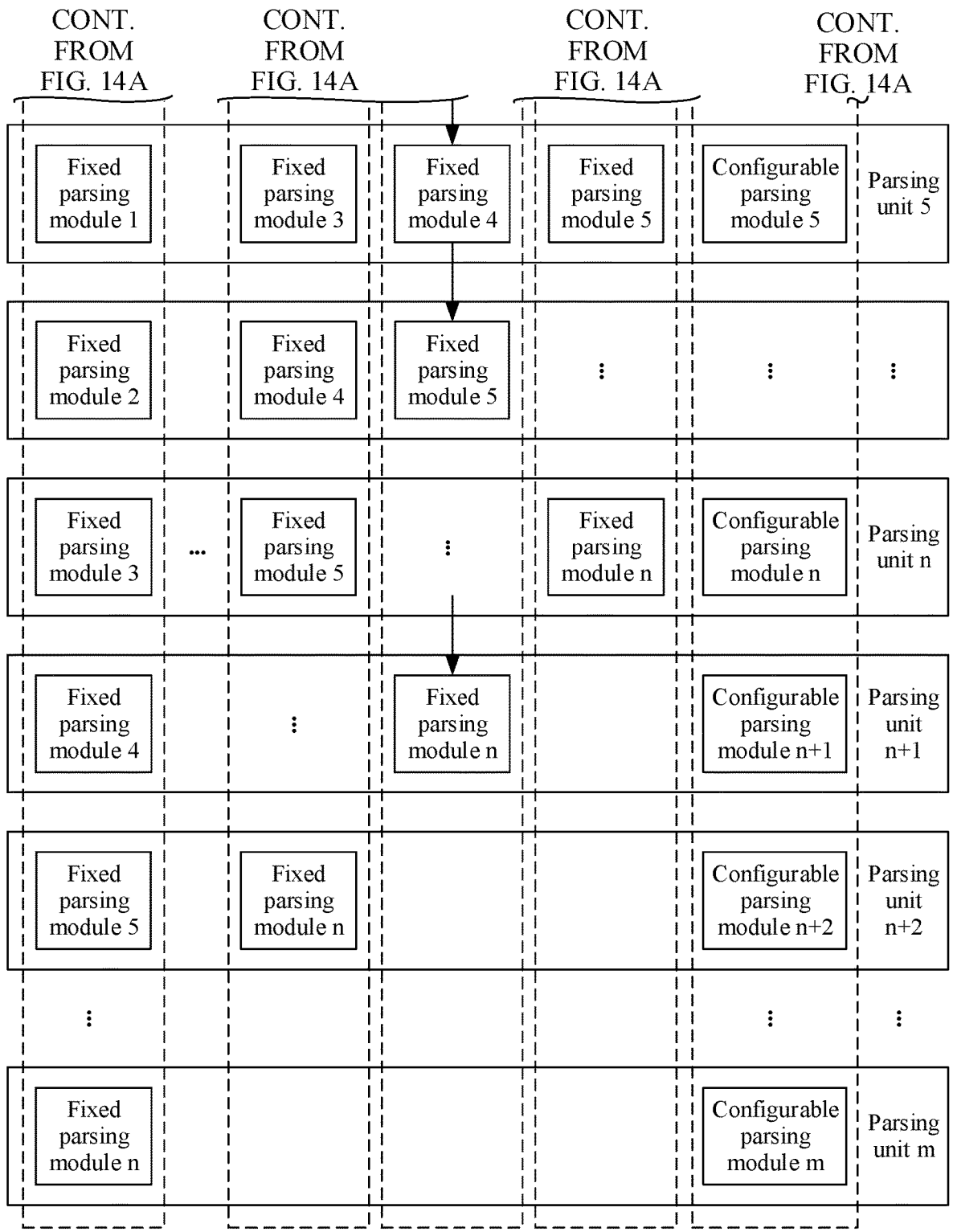

With reference to FIG. 14A and FIG. 14B, the fixed parsing module 1 in the parsing unit 1 first parses the packet (for example, the packet 1) input into the parsing component. After the fixed parsing module 1 in the parsing unit 1 successfully parses the packet 1, the fixed parsing module 2 and the configurable parsing module 2 in the parsing unit 2 separately parse the packet 1. If the configurable parsing module 2 successfully parses the packet 1, the parsing unit 2 determines that the packet 1 is a packet based on the newly added protocol P3', and then the configurable parsing module 3 in the parsing unit 3 parses the packet 1. After the configurable parsing module 3 in the parsing unit 3 successfully parses the packet 1, the fixed parsing module 3 to the fixed parsing module n in the fixed parsing group 2 sequentially parse the packet 1.

In conclusion, for the parsing component provided in this embodiment of this application, because the at least one parsing unit in the parsing component includes the fixed parsing module and the configurable parsing module, and the configurable parsing module enables the parsing component to support a protocol change, the scalability of the parsing component is strong. In addition, some stable protocols may be stored in the fixed parsing module, and a protocol that may change may be configured in the configurable parsing module. In this way, the configurable parsing module does not need to support all protocols, and this helps save parsing resources and reduce power consumption of packet parsing. In addition, the target parsing unit in the parsing component may separately parse, by using the fixed parsing module in the target parsing unit and the configurable parsing module in the target parsing unit, the packet input into the target parsing unit, and this helps improve packet parsing efficiency and the parsing efficiency of the parsing component.

The parsing component provided in this embodiment of this application combines the fixed parsing module and the configurable parsing module, so that parsing costs can be reduced, and a protocol evolution requirement can be met. For example, compared with a parsing component that uses only fixed parsing, the parsing component provided in this application can be configured, and can support protocol extension, for example, can support a 20% protocol extension capability, so that a capability of the parsing component and even the entire forwarding chip to support a future new service is greatly enhanced. Compared with a parsing component that uses only configurable parsing, the parsing component provided in this application can save at least 50% of parsing resources.

The foregoing describes the embodiment of the parsing component in this application, and the following describes an embodiment of the packet parsing method in this application.

The packet parsing method in this application may be applied to the foregoing parsing component. For a structure of the parsing component, refer to the foregoing embodiment. The packet parsing method may include: A target parsing unit separately parses, by using a fixed parsing module in the target parsing unit and a configurable parsing module in the target parsing unit, a packet input into the target parsing unit. The target parsing unit is any parsing unit that is in the parsing component and that includes a fixed parsing module and a configurable parsing module.

Figure 15:
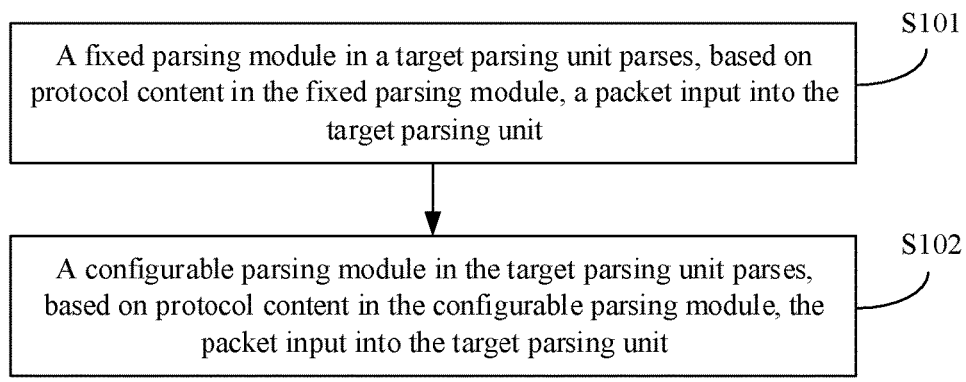
FIG. 15 is a flowchart of a packet parsing method according to an embodiment of this application.

In an optional embodiment, FIG. 15 is a flowchart of a packet parsing method according to this embodiment of this application. The packet parsing method includes the following S101 and S102.

S101: A fixed parsing module in a target parsing unit parses, based on protocol content in the fixed parsing module, a packet input into the target parsing unit.

S102: A configurable parsing module in the target parsing unit parses, based on protocol content in the configurable parsing module, the packet input into the target parsing unit.

The target parsing unit may further include an extraction module, and the extraction module is configured to extract protocol information from the packet input into the target parsing unit. In the target parsing unit, the fixed parsing module parses the packet based on the protocol information extracted by the extraction module from the packet and the protocol content in the fixed parsing module, and the configurable parsing module parses the packet based on the protocol information extracted by the extraction module from the packet and the protocol content in the configurable parsing module.

For example, the target parsing unit may be the parsing unit j shown in FIG. 9. For a process in which the target parsing unit parses the packet, refer to related descriptions in the embodiment shown in FIG. 9. Details are not described herein again.

In an optional embodiment, the fixed parsing module and the configurable parsing module each include a switch element, and the switch element in each parsing module in the fixed parsing module and the configurable parsing module is configured to control an enabled/disabled state of the parsing module. In S101, when the fixed parsing module in the target parsing unit is in an enabled state, the fixed parsing module parses, based on the protocol content in the fixed parsing module, the packet input into the target parsing unit. In S102, when the configurable parsing module in the target parsing unit is in an enabled state, the configurable parsing module parses, based on the protocol content in the configurable parsing module, the packet input into the target parsing unit.

In this embodiment of this application, the switch element is disposed in the parsing module to control the enabled/disabled state of the parsing module, so that the parsing module can be enabled or disabled as required, and parsing modules can be combined to support protocol extension.

In an optional embodiment, before S102, the method further includes: The configurable parsing module in a parsing component configures the protocol content in the configurable parsing module based on obtained content configuration information. For example, the configurable parsing module configures the protocol content in the configurable parsing module based on the content configuration information delivered by a controller, or the configurable parsing module configures the protocol content in the configurable parsing module based on the manually input content configuration information.

In an optional embodiment, a fixed parsing module in the parsing component corresponds to n protocol layers, and a fixed parsing module corresponding to each of the n protocol layers stores fixed protocol content of the protocol layer. That the configurable parsing module in a parsing component configures the protocol content in the configurable parsing module based on obtained content configuration information includes: The configurable parsing module in the parsing component configures protocol content of a target protocol layer in the configurable parsing module based on obtained content configuration information of the target protocol layer. The target protocol layer is one of the n protocol layers, or the target protocol layer is a protocol layer inserted into the n protocol layers.

In an optional embodiment, in m parsing units in the parsing component, a $j^{th}$ parsing unit includes a $j^{th}$ configurable parsing module and an $i^{th}$ fixed parsing module in a $k^{th}$ fixed parsing group, and a $(j-1)^{th}$ parsing unit includes a $(j-1)^{th}$ configurable parsing module and an $(i-1)^{th}$ fixed parsing module in the $k^{th}$ fixed parsing group. That the configurable parsing module in the parsing component configures protocol content of a target protocol layer in the configurable parsing module based on obtained content configuration information of the target protocol layer includes: The $j^{th}$ configurable parsing module configures the protocol content of the target protocol layer in the $j^{th}$ configurable parsing module based on the obtained content configuration information of the target protocol layer. The method further includes: The $(j-1)^{th}$ configurable parsing module configures a protocol type of the target protocol layer in the $(j-1)^{th}$ configurable parsing module based on obtained type configuration information of the target protocol layer. The target protocol layer is an $i^{th}$ protocol layer, or the target protocol layer is a protocol layer inserted between the $i^{th}$ protocol layer and an $(i+1)^{th}$ protocol layer. For example, as shown in FIG. 11, the target protocol layer may be the protocol layer 3. Alternatively, as shown in FIG. 13, the target protocol layer may be the protocol layer 3' inserted between the protocol layer 2 and the protocol layer 3.

Content of the packet parsing method in this application has been described in detail in the foregoing embodiment of the parsing component, and therefore is not described in detail in the embodiment of the packet parsing method. For an implementation process of the packet parsing method, refer to the foregoing embodiment of the parsing component.

In conclusion, according to the packet parsing method provided in this embodiment of this application, the target parsing unit in the parsing component may separately parse, by using the fixed parsing module in the target parsing unit and the configurable parsing module in the target parsing unit, the packet input into the target parsing unit. Therefore, this helps improve packet parsing efficiency and parsing efficiency of the parsing component.

An embodiment of this application further provides a forwarding chip. The forwarding chip includes the parsing component shown in FIG. 5 or the parsing component shown in FIG. 6A and FIG. 6B. The parsing component can support protocol extension, and parsing efficiency of the parsing component is high. Therefore, the forwarding chip can support protocol extension, and processing efficiency of the forwarding chip is high.

In an optional embodiment, the forwarding chip further includes a processing component and an editing component. The processing component may be a packet processing component, and the editing component may be a packet editing component. An architecture of the forwarding chip may be a pipeline architecture, and the parsing component, the processing component, and the editing component are sequentially connected.

The parsing component is configured to parse a packet input into the parsing component. For a process in which the parsing component parses the packet, refer to the foregoing embodiment of the parsing component.

The processing component is configured to process the packet based on a parsing result of the parsing component. For example, the parsing component parses the packet to obtain key information carried in the packet, and the processing component performs route searching and the like based on the key information of the packet.

The editing component is configured to edit the packet based on a processing result of the processing component. For example, the processing result of the processing component includes a next-hop address obtained by the processing component through route searching, and the editing component may encapsulate the next-hop address in the packet.

Figure 16:
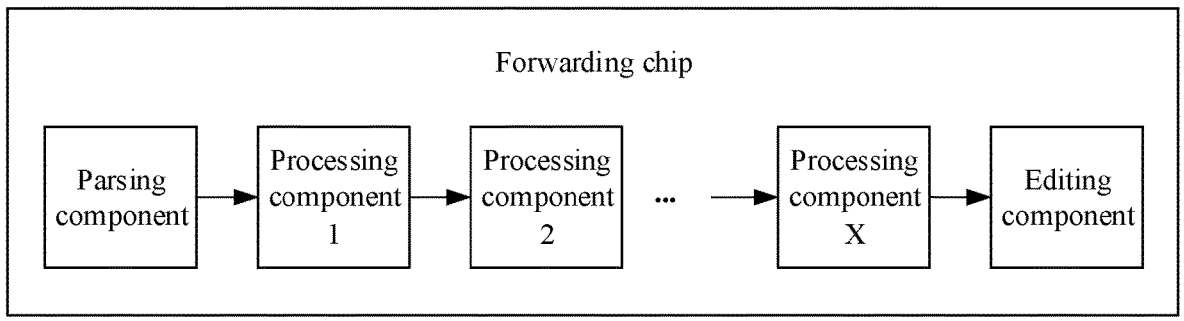
FIG. 16 is a schematic diagram of a structure of a forwarding chip according to an embodiment of this application.

In an optional embodiment, there may be one or more processing components in the forwarding chip. In this embodiment of this application, an example in which the forwarding chip includes X processing components is used for description. A structure of the forwarding chip may be shown in FIG. 16. The parsing component, the X processing components, and the editing component are sequentially connected. After the parsing component parses the packet input into the forwarding chip, the packet is sequentially processed by a processing component 1 to a processing component X and then transmitted to the editing component. The editing component edits the packet. After editing the packet, the editing component may forward the packet.

In an optional embodiment, the forwarding chip provided in this embodiment of this application may be various possible forwarding chips such as an ASIC chip, an FPGA chip, an NP chip, and a GAL chip.

An embodiment of this application further provides a network device. The network device includes the foregoing forwarding chip. For example, the network device includes the forwarding chip shown in FIG. 16. The network device may be any network device configured to forward a service in a communication network. For example, based on a device type, the network device may be a switch, a router, or the like. Based on a device deployment location, the network device may be an edge network device, a core network device, or a network device in a data center. For example, the edge network device may be a provider edge (PE) device, and the core network device may be a provider (P) device.

Figure 17:
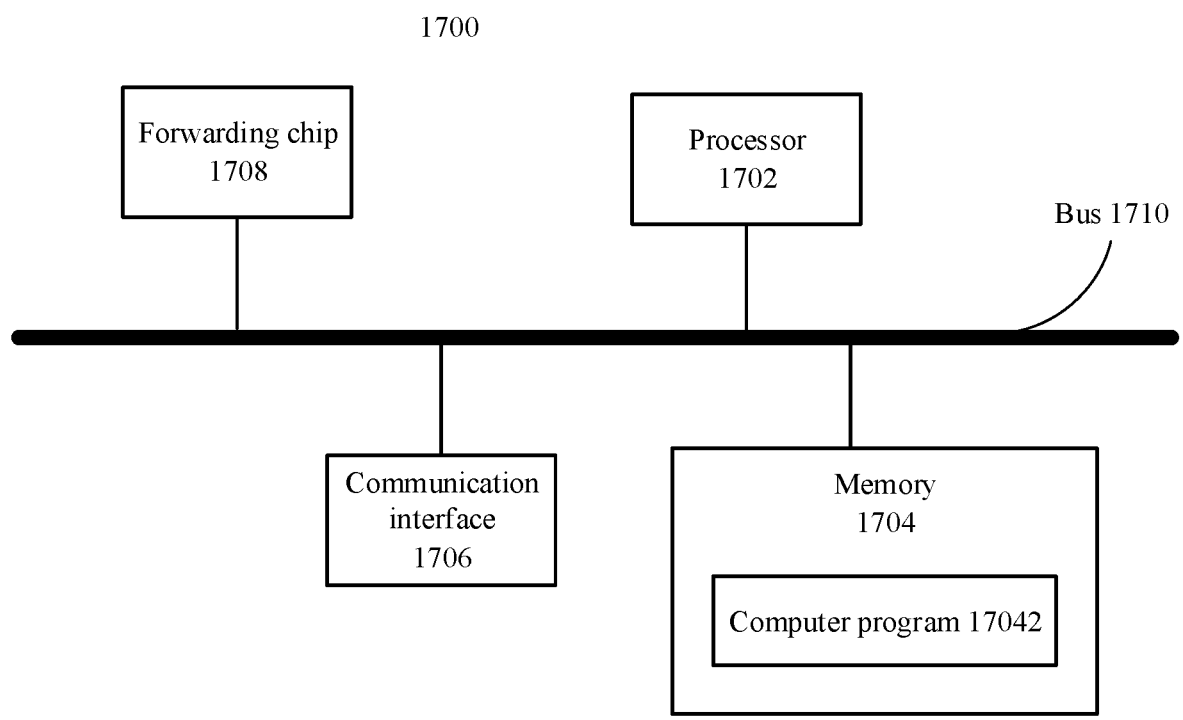
FIG. 17 is a schematic diagram of a structure of a network device according to an embodiment of this application.

In an example, FIG. 17 is a schematic diagram of a structure of a network device 1700 according to an embodiment of this application. The network device 1700 includes a processor 1702, a memory 1704, a communication interface 1706, a forwarding chip 1708, and a bus 1710. The processor 1702, the memory 1704, the communication interface 1706, and the forwarding chip 1708 are communicatively connected to each other through the bus 1710. A connection manner among the processor 1702, the memory 1704, the communication interface 1706, and the forwarding chip 1708 shown in FIG. 17 is merely an example. In an implementation process, the processor 1702, the memory 1704, the communication interface 1706, and the forwarding chip 1708 may alternatively be communicatively connected to each other in a connection manner other than using the bus 1710.

The memory 1704 may be configured to store a computer program 17042. The computer program 17042 may include instructions and data. In this embodiment of this application, the memory 1704 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, or a register. In addition, the memory 1704 may include a hard disk and/or an internal memory.

The processor 1702 may be a general-purpose processor. The general-purpose processor may be a processor that reads and executes a computer program (for example, the computer program 17042) stored in a memory (for example, the memory 1704) to perform a specific step and/or operation. In a process of performing the step and/or operation, the general-purpose processor may use data stored in the memory (for example, the memory 1704). The general-purpose processor may be, for example, but not limited to, a central processing unit (CPU). In addition, the processor 1702 may alternatively be a dedicated processor. The dedicated processor may be a processor specially designed to perform a specific step and/or operation. The dedicated processor may be, for example, but not limited to, an ASIC and an FPGA. In addition, the processor 1702 may alternatively be a combination of a plurality of processors, for example, a multi-core processor.

The communication interface 1706 may include an interface that is configured to implement component interconnection inside the network device 1700, for example, an input/output (I/O) interface, a physical interface, or a logical interface, and an interface that is configured to implement interconnection between the network device 1700 and another device (for example, a network device). The physical interface may be a gigabit Ethernet (GE) interface, and may be configured to implement interconnection between the network device 1700 and another device. The logical interface is an interface inside the network device 1700, and may be configured to implement component interconnection inside the network device 1700. It is easy to understand that the communication interface 1706 may be used by the network device 1700 to communicate with another device. For example, the communication interface 1706 is used for packet sending and receiving between the network device 1700 and another device.

The bus 1710 may be any type of communication bus, for example, a system bus, that is configured to implement interconnection among the processor 1702, the memory 1704, the communication interface 1706, and the forwarding chip 1708.

The forwarding chip 1708 may be various possible forwarding chips such as an ASIC chip, an FPGA chip, an NP chip, and a GAL chip. For a structure of the forwarding chip 1708, refer to the embodiments shown in FIG. 16, FIG. 5, and FIG. 6A and FIG. 6B. Details are not described herein again. Interconnection between the forwarding chip 1708 and any component in the processor 1702, the memory 1704, and the communication interface 1706 may specifically refer to interconnection between the component and a component in the forwarding chip 1708. In some embodiments, the processor 1702, the memory 1704, and the communication interface 1706 may all be integrated into the forwarding chip 1708, or the processor 1702, the memory 1704, and the communication interface 1706 may be separately disposed on chips independent of each other, or at least a part or all of the processor 1702, the memory 1704, and the communication interface 1706 may be disposed on a same chip. Whether the components are separately disposed on different chips or integrated and disposed on one or more chips usually depends on a requirement of a product design. A specific implementation form of the component is not limited in this application.

The network device 1700 shown in FIG. 17 is merely an example. In an implementation process, the network device 1700 may further include other components, which are not enumerated one by one in this specification.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, all or some of the procedures or functions according to embodiments of this application are generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage apparatus, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

It should be understood that, in this application, "at least one" means one or more, and "a plurality of" means two or more. In this application, unless otherwise specified, the symbol "/" means "or". For example, A/B represents A or B. "And/or" in this application describes only an association relationship between associated objects and represents that three relationships may exist. For example, A and/or B may represent the following three cases: Only A exists, both A and B exist, and only B exists. In addition, for ease of clear description, in this application, terms such as "first", "second", and "third" are used to distinguish between same items or similar items that have basically same functions and purposes. It may be understood that the terms such as "first", "second", and "third" do not limit a quantity and an execution sequence.

For different types of embodiments such as the method embodiment and the apparatus embodiment provided in embodiments of this application, refer to each other. This is not limited in embodiments of this application. A sequence of the operations of the method embodiment provided in embodiments of this application can be properly adjusted, and operations can be correspondingly added or deleted based on a situation. Any modified method that can be easily figured out by a person skilled in the art without departing from a technical scope disclosed in this application shall fall within the protection scope of this application, and therefore details are not described again.

In the corresponding embodiments provided in this application, it should be understood that the disclosed apparatus and the like may be implemented in other composition manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts described as units may or may not be physical units, that is, may be located at one position, or may be distributed on a plurality of network devices (for example, terminal devices). Some or all of the units may be selected based on an actual requirement to achieve the objectives of the solutions of embodiments.

The foregoing descriptions are merely example implementations of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A parsing component, comprising m parsing units, wherein m is a positive integer;
   at least one parsing unit in the m parsing units comprises a fixed parsing module and a configurable parsing module;
   the fixed parsing module stores fixed protocol content, the configurable parsing module is configured to configure protocol content in the configurable parsing module based on obtained content configuration information, and each parsing module in the fixed parsing module and the configurable parsing module is configured to parse, based on the protocol content in the parsing module, a packet input into the parsing module; and
   a target parsing unit in the m parsing units is configured to separately parse, by using a fixed parsing module in the target parsing unit and a configurable parsing module in the target parsing unit, a packet input into the target parsing unit, wherein the target parsing unit is any parsing unit that is in the m parsing units and that comprises a fixed parsing module and a configurable parsing module;
   wherein a fixed parsing module in the m parsing units corresponds to n protocol layers, a fixed parsing module corresponding to each protocol layer stores fixed protocol content of the protocol layer, and n is a positive integer; and
   the configurable parsing module is configured to configure protocol content of a target protocol layer in the configurable parsing module based on obtained content configuration information of the target protocol layer, wherein the target protocol layer is one of the n protocol layers, or the target protocol layer is a protocol layer inserted into the n protocol layers;
   the m parsing units are sequentially connected, the m parsing units each comprise a fixed parsing module, fixed parsing modules in the m parsing units form w fixed parsing groups, each fixed parsing group comprises n fixed parsing modules, and the n fixed parsing modules are in a one-to-one correspondence with the n protocol layers; and
   an $i^{th}$ fixed parsing module in the n fixed parsing modules stores fixed protocol content of an $i^{th}$ protocol layer in the n protocol layers, and an $(i-1)^{th}$ fixed parsing module in the n fixed parsing modules stores a fixed protocol type of the $i^{th}$ protocol layer, wherein the $i^{th}$ fixed parsing module corresponds to the $i^{th}$ protocol layer, $1<i\leq n$, and both w and i are positive integers.

2. The parsing component according to claim 1, wherein the m parsing units each comprise a configurable parsing module;
   in the m parsing units, a $j^{th}$ parsing unit comprises a $j^{th}$ configurable parsing module and an $i^{th}$ fixed parsing module in a $k^{th}$ fixed parsing group, and a $(j-1)^{th}$ parsing unit comprises a $(j-1)^{th}$ configurable parsing module and an $(i-1)^{th}$ fixed parsing module in the $k^{th}$ fixed parsing group, wherein $1<k\leq w$, $1<j\leq m$, and both k and j are integers;
   the $j^{th}$ configurable parsing module is configured to configure the protocol content of the target protocol layer in the $j^{th}$ configurable parsing module based on the obtained content configuration information of the target protocol layer; and
   the $(j-1)^{th}$ configurable parsing module is configured to configure a protocol type of the target protocol layer in the $(j-1)^{th}$ configurable parsing module based on obtained type configuration information of the target protocol layer, wherein
   the target protocol layer is the $i^{th}$ protocol layer, or the target protocol layer is a protocol layer inserted between the $i^{th}$ protocol layer and an $(i+1)^{th}$ protocol layer in the n protocol layers.

3. The parsing component according to claim 2, wherein $j=i+s\times(k-1)$, wherein i takes all values in a range [1, j], and s is determined based on an arrangement of the w fixed parsing groups.

4. The parsing component according to claim 3, wherein
the w fixed parsing groups are arranged in an array along a first direction, and w first fixed parsing modules in the w fixed parsing groups belong to w parsing units in the m parsing units; and for any two adjacent fixed parsing groups in the w fixed parsing groups, there is an interval of s−1 parsing units between two parsing units to which two first fixed parsing modules in the two fixed parsing groups belong.

5. The parsing component according to claim 4, wherein
for the $k^{th}$ fixed parsing group, a $(k+1)^{th}$ fixed parsing group, and a $(k+2)^{th}$ fixed parsing group, a parsing unit to which the first fixed parsing module in the $(k+1)^{th}$ fixed parsing group belongs is located after a parsing unit to which the first fixed parsing module in the $k^{th}$ fixed parsing group belongs, and a parsing unit to which the first fixed parsing module in the $(k+2)^{th}$ fixed parsing group belongs is located after the parsing unit to which the first fixed parsing module in the $(k+1)^{th}$ fixed parsing group belongs; and the $k^{th}$ fixed parsing group, the $(k+1)^{th}$ fixed parsing group, and the $(k+2)^{th}$ fixed parsing group are any three adjacent fixed parsing groups in the w fixed parsing groups.

6. The parsing component according to claim 4, wherein
the w parsing units are w parsing units located at the forefront in the m parsing units.

7. The parsing component according to claim 4, wherein
a configurable parsing module in the m parsing units forms a configurable parsing group, and the first direction is a direction from approaching the configurable parsing group to being away from the configurable parsing group; and in the w fixed parsing groups, a fixed parsing group closest to the configurable parsing group is the first fixed parsing group, and a fixed parsing group farthest from the configurable parsing group is a $w^{th}$ fixed parsing group.

8. The parsing component according to claim 7, wherein
the first configurable parsing module in the configurable parsing group and the first fixed parsing module in the first fixed parsing group belong to a same parsing unit.

9. The parsing component according to claim 3, wherein s=1.

10. The parsing component according to claim 1, wherein
the fixed parsing module and the configurable parsing module each comprise a switch element, and the switch element in each parsing module in the fixed parsing module and the configurable parsing module is configured to control an enabled/disabled state of the parsing module; and each parsing module in the fixed parsing module and the configurable parsing module is configured to: when the parsing module is in an enabled state, parse, based on the protocol content in the parsing module, the packet input into the parsing module.

11. A network device, comprising a parsing component, where the parsing component comprises m parsing units, wherein m is a positive integer;

at least one parsing unit in the m parsing units comprises a fixed parsing module and a configurable parsing module;

the fixed parsing module stores fixed protocol content, the configurable parsing module is configured to configure protocol content in the configurable parsing module based on obtained content configuration information, and each parsing module in the fixed parsing module and the configurable parsing module is configured to parse, based on the protocol content in the parsing module, a packet input into the parsing module; and a target parsing unit in the m parsing units is configured to separately parse, by using a fixed parsing module in the target parsing unit and a configurable parsing module in the target parsing unit, a packet input into the target parsing unit, wherein the target parsing unit is any parsing unit that is in the m parsing units and that comprises a fixed parsing module and a configurable parsing module wherein a fixed parsing module in the m parsing units corresponds to n protocol layers, a fixed parsing module corresponding to each protocol layer stores fixed protocol content of the protocol layer, and n is a positive integer; and the configurable parsing module is configured to configure protocol content of a target protocol layer in the configurable parsing module based on obtained content configuration information of the target protocol layer, wherein the target protocol layer is one of the n protocol layers, or the target protocol layer is a protocol layer inserted into the n protocol layers;

the m parsing units are sequentially connected, the m parsing units each comprise a fixed parsing module, fixed parsing modules in the m parsing units form w fixed parsing groups, each fixed parsing group comprises n fixed parsing modules, and the n fixed parsing modules are in a one-to-one correspondence with the n protocol layers; and an $i^{th}$ fixed parsing module in the n fixed parsing modules stores fixed protocol content of an $i^{th}$ protocol layer in the n protocol layers, and an $(i-1)^{th}$ fixed parsing module in the n fixed parsing modules stores a fixed protocol type of the $i^{th}$ protocol layer, wherein the $i^{th}$ fixed parsing module corresponds to the $i^{th}$ protocol layer, $1<i\le n$, and both w and i are positive integers.

12. A method, applied to a parsing component, wherein the parsing component comprises m parsing units, at least one parsing unit in the m parsing units comprises a fixed parsing module and a configurable parsing module, the fixed parsing module stores fixed protocol content, the configurable parsing module is configured with protocol content, and m is a positive integer; and the method comprises:

separately parsing, by a target parsing unit in the m parsing units by using a fixed parsing module in the target parsing unit and a configurable parsing module in the target parsing unit, a packet input into the target parsing unit, wherein the target parsing unit is any parsing unit that is in the m parsing units and that comprises a fixed parsing module and a configurable parsing module, wherein the separately parsing, by a fixed parsing module in the target parsing unit and a configurable parsing module in the target parsing unit, a packet input into the target parsing unit comprises:

parsing, by the fixed parsing module, the packet based on protocol content in the fixed parsing module; and parsing, by the configurable parsing module, the packet based on protocol content in the configurable parsing module;

wherein a fixed parsing module in the m parsing units corresponds to n protocol layers, a fixed parsing module corresponding to each protocol layer stores fixed protocol content of the protocol layer, and n is a positive integer; and the configuring, by the configurable parsing module, the protocol content in the configurable parsing module based on obtained content configuration information comprises: configuring, by the configurable parsing module, protocol content of a target protocol layer in the configurable parsing module based on obtained content configuration information of the target protocol layer, wherein the target protocol layer is one of the n protocol layers, or the target protocol layer is a protocol layer inserted into the n protocol layers;

the m parsing units are sequentially connected, the m parsing units each comprise a configurable parsing module and a fixed parsing module, fixed parsing modules in the m parsing units form w fixed parsing groups, each fixed parsing group comprises n fixed parsing modules, the n fixed parsing modules are in a one-to-one correspondence with the n protocol layers, an $i^{th}$ fixed parsing module in the n fixed parsing modules stores fixed protocol content of an $i^{th}$ protocol layer in the n protocol layers, and an $(i-1)^{th}$ fixed parsing module in the n fixed parsing modules stores a fixed protocol type of the $i^{th}$ protocol layer, wherein the $i^{th}$ fixed parsing module corresponds to the $i^{th}$ protocol layer, $1<i \leq n$, and both w and i are positive integers;

in the m parsing units, a $i^{th}$ parsing unit comprises a $j^{th}$ configurable parsing module and an $i^{th}$ fixed parsing module in a $k^{th}$ fixed parsing group, and a $(j-1)^{th}$ parsing unit comprises a $(j-1)^{th}$ configurable parsing module and an $(i-1)^{th}$ fixed parsing module in the $k^{th}$ fixed parsing group, wherein $1 \leq k \leq w$, $1 < j \leq m$, and both k and j are integers;

the configuring, by the configurable parsing module, protocol content of a target protocol layer in the configurable parsing module based on obtained content configuration information of the target protocol layer comprises: configuring, by the $j^{th}$ configurable parsing module, the protocol content of the target protocol layer in the $j^{th}$ configurable parsing module based on the obtained content configuration information of the target protocol layer; and the method further comprises: configuring, by the $(j-1)^{th}$ configurable parsing module, a protocol type of the target protocol layer in the $(i-1)^{th}$ configurable parsing module based on obtained type configuration information of the target protocol layer, wherein the target protocol layer is the $i^{th}$ protocol layer, or the target protocol layer is a protocol layer inserted between the $i^{th}$ protocol layer and an $(i+1)^{th}$ protocol layer in the n protocol layers.

13. The method according to claim 12, wherein the method further comprises:

configuring, by the configurable parsing module, the protocol content in the configurable parsing module based on obtained content configuration information.

14. The method according to claim 12, wherein the fixed parsing module and the configurable parsing module each comprise a switch element, and the switch element in each parsing module in the fixed parsing module and the configurable parsing module is configured to control an enabled/disabled state of the parsing module;

the parsing, by the fixed parsing module, the packet based on protocol content in the fixed parsing module comprises:

when the fixed parsing module is in an enabled state, parsing, by the fixed parsing module, the packet based on the protocol content in the fixed parsing module; and the parsing, by the configurable parsing module, the packet based on protocol content in the configurable parsing module comprises:

when the configurable parsing module is in an enabled state, parsing, by the configurable parsing module, the packet based on the protocol content in the configurable parsing module.

* * * * *